(12) United States Patent
Bone et al.

(10) Patent No.: US 8,086,553 B2
(45) Date of Patent: Dec. 27, 2011

(54) METHOD AND APPARATUS FOR MANAGING FILE SYSTEMS AND FILE-BASED DATA STORAGE

(75) Inventors: Jeff G. Bone, Austin, TX (US); Brett A. Funderburg, Austin, TX (US); A. Paul Jimenez, Austin, TX (US); Laura Arbilla, Austin, TX (US)

(73) Assignee: Stored IQ, Inc., Austin, TX (US)

( * ) Notice: Subject to any disclaimer, the term of this patent is extended or adjusted under 35 U.S.C. 154(b) by 706 days.

(21) Appl. No.: 11/973,700

(22) Filed: Oct. 10, 2007

(65) Prior Publication Data

US 2008/0091739 A1    Apr. 17, 2008

Related U.S. Application Data

(62) Division of application No. 10/630,339, filed on Jul. 30, 2003, now Pat. No. 7,610,329.

(60) Provisional application No. 60/399,828, filed on Jul. 30, 2002, provisional application No. 60/399,723, filed on Jul. 30, 2002, provisional application No. 60/399,879, filed on Jul. 30, 2002, provisional application No. 60/399,872, filed on Jul. 30, 2002, provisional application No. 60/399,830, filed on Jul. 30, 2002, provisional application No. 60/399,831, filed on Jul. 30, 2002.

(51) Int. Cl.
*G06F 17/00* (2006.01)
*G06N 5/02* (2006.01)
(52) U.S. Cl. ........................................ 706/47
(58) Field of Classification Search .................. None
See application file for complete search history.

(56) References Cited

U.S. PATENT DOCUMENTS

| | | | |
|---|---|---|---|
| 4,887,204 A | 12/1989 | Johnson et al. |
| 4,897,781 A | 1/1990 | Chang et al. |
| 5,151,989 A | 9/1992 | Johnson et al. |
| 5,175,851 A | 12/1992 | Johnson et al. |
| 5,287,507 A | 2/1994 | Hamilton et al. |
| 5,313,646 A | 5/1994 | Hendricks et al. |
| 5,452,447 A | 9/1995 | Nelson et al. |
| 5,745,752 A | 4/1998 | Hurvig et al. |
| 5,764,908 A | 6/1998 | Shoji et al. |
| 5,764,972 A | 6/1998 | Crouse et al. |
| 5,819,292 A | 10/1998 | Hitz et al. |
| 5,864,659 A | 1/1999 | Kini |
| 5,870,734 A | 2/1999 | Kao |
| 5,870,746 A | 2/1999 | Knutson et al. |
| 5,926,805 A | 7/1999 | Hurvig et al. |
| 5,931,918 A | 8/1999 | Row et al. |
| 5,948,062 A | 9/1999 | Tzelnic et al. |
| 5,987,506 A | 11/1999 | Carter |

(Continued)

OTHER PUBLICATIONS

Crichlow, 'An Introduction to distributed and parallel computing': 1988, Simon & Schuster, pp. 1-209.*

(Continued)

*Primary Examiner* — Omar Fernandez Rivas
*Assistant Examiner* — Peter Coughlan
(74) *Attorney, Agent, or Firm* — Sprinkle IP Law Group

(57) ABSTRACT

Embodiments of the present invention can comprise systems and methods for managing filesystems and can provide a programmable filesystem with active rules and policies, an n-tier network filesystem, stack mounting, a union filesystem with write-through semantics, a filesystem middleware with selective delegation, a filesystem with a statistical warehouse and/or other management functionality.

20 Claims, 21 Drawing Sheets

U.S. PATENT DOCUMENTS

| | | | |
|---|---|---|---|
| 6,078,929 | A | 6/2000 | Rao |
| 6,081,807 | A | 6/2000 | Story et al. |
| 6,085,234 | A | 7/2000 | Pitts et al. |
| 6,122,629 | A | 9/2000 | Walker et al. |
| 6,134,583 | A | 10/2000 | Herriot |
| 6,161,191 | A | 12/2000 | Slaughter et al. |
| 6,173,293 | B1 | 1/2001 | Thekkath |
| 6,192,408 | B1 | 2/2001 | Vahalia et al. |
| 6,233,624 | B1 | 5/2001 | Hyder et al. |
| 6,247,139 | B1 | 6/2001 | Walker et al. |
| 6,266,785 | B1 | 7/2001 | McDowell |
| 6,298,386 | B1 | 10/2001 | Vahalia et al. |
| 6,317,844 | B1 | 11/2001 | Kleiman |
| 6,334,123 | B1 | 12/2001 | Ross et al. |
| 6,366,987 | B1 | 4/2002 | Tzelnic et al. |
| 6,385,624 | B1 | 5/2002 | Shinkai |
| 6,389,420 | B1 | 5/2002 | Vahalia et al. |
| 6,453,353 | B1 | 9/2002 | Win et al. |
| 6,463,465 | B1 | 10/2002 | Nieuwejaar |
| 6,487,552 | B1 | 11/2002 | Lei et al. |
| 6,654,814 | B1 | 11/2003 | Britton et al. |
| 6,754,660 | B1 | 6/2004 | MacPhail |
| 6,833,865 | B1 | 12/2004 | Fuller et al. |
| 7,017,183 | B1 | 3/2006 | Frey et al. |
| 7,249,168 | B1 | 7/2007 | Ryder |
| 7,610,329 | B2 | 10/2009 | Bone et al. |
| 7,620,665 | B1 | 11/2009 | George et al. |
| 7,801,894 | B1 | 9/2010 | Bone et al. |
| 7,805,449 | B1 | 9/2010 | Bone et al. |
| 7,844,582 | B1 | 11/2010 | Arbilla |
| 2002/0046262 | A1 | 4/2002 | Heilig et al. |
| 2002/0088000 | A1 | 7/2002 | Morris |
| 2002/0091710 | A1 | 7/2002 | Dunham et al. |
| 2002/0174306 | A1 | 11/2002 | Gajjar et al. |
| 2002/0198976 | A1 | 12/2002 | Davenport |
| 2003/0009469 | A1 | 1/2003 | Platt et al. |
| 2003/0135505 | A1 | 7/2003 | Hind |
| 2003/0135513 | A1 | 7/2003 | Quinn et al. |
| 2003/0212676 | A1 | 11/2003 | Bruce et al. |
| 2004/0098415 | A1 | 5/2004 | Bone et al. |
| 2004/0181753 | A1 | 9/2004 | Michaelides |
| 2005/0120025 | A1 | 6/2005 | Rodriguez et al. |
| 2005/0183143 | A1 | 8/2005 | Anderholm et al. |
| 2006/0004830 | A1 | 1/2006 | Lora et al. |
| 2006/0036605 | A1 | 2/2006 | Powell et al. |
| 2006/0089932 | A1 | 4/2006 | Buehler et al. |
| 2006/0117014 | A1 | 6/2006 | Qi |
| 2006/0184530 | A1 | 8/2006 | Song et al. |
| 2006/0190455 | A1 | 8/2006 | Braddy et al. |
| 2006/0248085 | A1 | 11/2006 | Sack et al. |
| 2006/0277184 | A1 | 12/2006 | Faitelson et al. |
| 2007/0022129 | A1 | 1/2007 | Bahar et al. |
| 2010/0179941 | A1 | 7/2010 | Agrawal et al. |
| 2010/0306337 | A1 | 12/2010 | DeHaan |

OTHER PUBLICATIONS

'N-DFS: The Multiple Dimensional File System' from 'configuration management': Fowler, 1994, John Wiley & Sons.*
'Scalable integration: from enterprise information management to real time process control using the metadatabase model': Schaefer, 1994, IEEE, p. 1860-1867.*
Katic N., Quirchmay G., Schiefer J., Stolba M., Tjoa AM. 'A prototype model for data warehouse security based on metadata'[online]. Computer.org 1998 [retrieved on Mar. 31, 2011]. Retrieved from the Internet<http://scholar.google.com/scholar?q=%22a+prototype+model+for+data+warehouse+security%22&hl=en&as_sdt=1%2C47&as_sdtp=on>.*
Staudt M., Vaduva A. 'Meatdata management and data warehousing' University of Zurich [retrieved on Mar. 31, 2011]. Retrieved from the internet:<ftp://ftp.ifi.unizh.ch/pub/techreports/TR-99/ifi-99.04.pdf>.*
Office Action Issued in U.S. Appl. No. 10/630,339, 28 pages, Mar. 31, 2008.
RFC1094 "Network Working Group Request for Comments: 1094" Sun Microsystems, Inc., accessed at www.faqs.org/rfcs/rfc1094.html, Mar. 1989.
"File and Storage System Design", accessed at www.eecs.harvard.edu/~vino/fs-perf/, Jul. 25, 2002.
"The extended-2 filesystem overview", vol. 1, Aug. 3, 1995.
"Draft-leach-cifs-v1-spec-02" Network Working Group, accessed at www.ubiqx.org/cifs/rfc-draft/draft-leach-cifs-v1-spec-02.html, Mar. 13, 1997.
AFS Frequently Asked Questions, accessed at www.angelfire.com/hi/plutonic/afs-faq.html, Jul. 25, 2002.
Coda File System, accessed at www.coda.cs.cmu.edu/index.html, Jul. 25, 2002.
RFC1777 "Network Working Group Request for Comments: 1777" Performance Systems International, accessed at www.faqs.org/rfcs/rfc1777.html, Mar. 1995.
"Active Directory: A Platform for Directory-enabled Networking", accessed at www.microsoft.com/windows2000/techinfo/planning/activedirectory/denad.asp, Nov. 7, 2000.
Pendry, "Amd an Automounter (1989)", accessed at www.citeseer.ni.nec.com/pendry89amd.html, Jul. 25, 2002.
Oga, "Autofs Automounter HOWTO", accessed at www.linux-consulting.com/Amd_AutoFS/autofs.html, Dec. 1998.
Satran, et al. "IPS Internet Draft: iSCSI", accessed at www.ietf.org/internet-drafts/draft-ietf-ips-iscsi-14.txt, Jul. 1, 2002.
Rajagopal, et al. "IPS Working Group: Fibre Channel Over TCP/IP (FCIP)", accessed at www.ietf.org/internet-drafts/draft-ietf-ips-fcovertcpip-11.txt, Dec. 2002.
Rodriguez, et al. "IP Storage (IPS)", accessed at www.ietf.org/html/charters/ips-charter.html, Jul. 5, 2002.
"Distributed File System: White Paper", accessed at www.microsoft.com/windows2000/techinfo/howitworks/fileandprint/dfsnew.asp, Apr. 19, 1999.
Spuhler, "An Analysis of NFS Protocol Version 4" Hewlett Packard, available from tom_spuhler@hp.com, no date.
"Intermezzo", accessed at www.inter-mezzo.org, Jul. 25, 2002.
"FiST Home Page", accessed at www.cs.columbia.edu/~ezk/research/fist/, Jul. 25, 2002.
"FAM FAQ", accessed at www.oss.sgi.com/projects/fam/fao.html, Jul. 25, 2002.
"Yeast: A General Purpose Event-Action", vol. 21, No. 10, IEEE, accessed at www.computer.org/tse/ts1995/e0845abs.htm, Oct. 1995.
Anderson, et al. "Serverless Network File Systems" accessed at www.citeseer.nj.nec.com/anderson95serverless.html, 1995.
Zukunft, "Recovering Active Databases" accessed at www.citeseer.nj.nec.com/zukunft95recovering.html, 1995.
Jaeger, et al., "An Annotated Bibliography on Active Databases" accessed at www.citeseer.nj.nec.com/221310/html, 1995.
Fowler, et al. "n-DFS: The multiple dimensional file system", pp. 135-154, pub. John Wiley & Sons Ltd., 1994.
Stern, et al. "Managing NFS and NIS" Second Edition, pub. By O'Reilly, Jun. 2001.
Office Action issued in U.S. Appl. No. 10/630,339, Dec. 15, 2006.
Office Action issued in U.S. Appl. No. 10/630,339, May 31, 2007.
Notice of Allowance issued in U.S. Appl. No. 11/262,411, mailed Sep. 16, 2010, 12 pages.
http://web.archive.org/web/20030213030333/www.deepfile.com/product.html, printed Aug. 21, 2007, 1 page.
http://web.archive.org/web/20030811035225/www.deepfile.com/product_auditor.html, printed Aug. 23, 2007, 2 pages.
http://web.archive.org/web/20030213231952/www.deepfile.com/product_enforcer.html, printed Aug. 21, 2007, 2 pages.
http://web.archive.org/web/20030213031244/www.deepfile.com/solutions.html, printed Aug. 21, 2007, 1 page.
http://web.archive.org/web/20030214024310/www.deepfile.com/solutions_reporting.html, printed Aug. 21, 2007, 3 pages.
http://web.archive.org/web/20030214024344/www.deepfile.com/solutions_retention.html, printed Aug. 21, 2007, 2 pages.
http://web.archive.org/web/20030410120618/www.deepfile.com/solutions_hsm.html, printed Aug. 21, 2007, 2 pages.
http://web.archive.org/web/20030214023502/www.deepfile.com/solutions_consolidation.html, printed Aug. 21, 2007, 2 pages.
http://web.archive.org/web/20030811035627/www.deepfile.com/solutions_chargeback.html, printed Aug. 21, 2007, 3 pages.
Office Action issued in U.S. Appl. No. 10/630,339, mailed Nov. 1, 2007, 32 pages.

Office Action issued in U.S. Appl. No. 10/630,339, mailed Dec. 19, 2008, 32 pages.
Office Action issued in U.S. Appl. No. 11/262,282, mailed Oct. 2, 2007, 19 pages.
Office Action issued in U.S. Appl. No. 11/262,282, mailed Apr. 17, 2008, 19 pages.
Office Action issued in U.S. Appl. No. 11/262,282, mailed Jul. 2, 2009, 18 pages.
Office Action issued in U.S. Appl. No. 11/262,411, mailed Oct. 4, 2007, 14 pages.
Office Action issued in U.S. Appl. No. 11/262,411, mailed Mar. 4, 2008, 14 pages.
Office Action issued in U.S. Appl. No. 11/262,411, mailed Aug. 6, 2008, 13 pages.
Office Action issued in U.S. Appl. No. 11/262,411, mailed Jan. 26, 2009, 18 pages.
Office Action issued in U.S. Appl. No. 11/262,411, mailed Sep. 17, 2009, 19 pages.
International Search Report issued in International Patent Application No. PCT/US03/24074, mailed Aug. 3, 2004, 6 pages.
Office Action issued in U.S. Appl. No. 11/262,283, mailed Sep. 25, 2007, 16 pages.
Bone, Jeff. "Beberg's Question Re: What Deepfile Does," Jun. 19, 2003. http://www.xent.com/pipermail/fork/2003-June/022380.html, 3 pages.
Office Action issued in U.S. Appl. No. 11/262,283, mailed Apr. 17, 2008, 14 pages.
Office Action issued in U.S. Appl. No. 11/262,283, mailed Jul. 2, 2009, 14 pages.
Office Action issued in U.S. Appl. No. 11/262,283, mailed Jan. 7, 2010, 14 pages.
Office Action issued in U.S. Appl. No. 11/262,282, mailed Jan. 7, 2010, 13 pages.
Office Action issued in U.S. Appl. No. 11/973,846, mailed Apr. 26, 2010, 45 pgs.
Office Action issued in U.S. Appl. No. 11/262,411, mailed May 25, 2010, 24 pages.
Office Action issued in U.S. Appl. No. 11/973,846, mailed Jul. 7, 2010, 58 pgs.
http://web.archive.org/web/20030810202503/www.deepfile.com/product.html, Aug. 2003, 1 page.
http://web.archive.org/web/20030811035225/www.deepfile.com/product_auditor.html, Aug. 2003, 2 pages.
"http://web.archive.org/web/20030811035459/www.deepfile.com/product_enforcer.html, Aug. 2003, 2 pages."
http://web.archive.org/web/20030810211526/www.deepfile.com/solutions.html, Aug. 2003, 1 page.
http://web.archive.org/20030811040239/deepfile.com/solutions_reporting.html, Aug. 2003, 3 pages.
http://web.archive.org/20030811040409/deepfile.com/solutions_retention.html, Aug. 2003, 2 pages.
http://web.archive.org/web/20030811040215/www.deepfile.com/solutions_hsm.html, Aug. 2003, 2 pages.
http://web.archive.org/web/20030811035531/www.deepfile.com/solutions_consolidation.html, Aug. 2003, 2 pages.
http://web.archive.org/web/20030811035627/www.deepfile.com/solutions_chargeback.html, Aug. 2003, 3 pages.
Office Action issued in U.S. Appl. No. 11/937,846, mailed Oct. 27, 2010, 70 pages.
Office Action issued in U.S. Appl. No. 12/572,160, mailed Mar. 15, 2011, 38 pages.
Office Action for U.S. Appl. No. 12/840,804, mailed Jun. 2, 2011, 24 pgs.
Notice of Allowance for U.S. Appl. No. 11/973,846, mailed Jul. 8, 2011, 16 pgs.

* cited by examiner

```
{{{
/* This module implements "write-through" semantics:
   First, the operation is attempted in the topbase,
   If the file/dir doesn't exist in the topbase, then
   it is attempted in the bottombases recursively. We
   consider only pairwise layers; it is understood that
   the stack is arbitrarily deep, and upon each iteration
   through the stack the previous bottombase becomes the
   new topbase.

Whiteouts:
   if a file exists in both layers:
      if it is removed: remove from top, create a whiteout to hide bottom
   if a file exits on top and not on bottom layer:
      if it is removed: remove from top
   if a file exists in bottom and not on top layer:
      if it is removed: remove from bottom
   if a file is whiteout on top and it exists in bottom:
   if a file is whiteout on top and it exists in bottom:
      if it is removed: do nothing
      if it is created: remove whiteout and create one on top
      if it is to be accessed: FAIL.

When an operation involves 2 file names:
   - rename(from,to) gets called only if from and to are in this namespace.
   - symlink(from,to) gets called only if from is in this namespace
          (to may or may not be in the name space)
   - link(from,to) gets called only if from and to are in this namespace
*/
```

*FIG. 20*

```
Operations on file that must exist.
getattr
readlink
chmod
chown
truncate
utime
read Semantics:
fcn (path, args)
{
   GetTopPathState(path, NULL, &topExists, &isWhiteOut, &topPath);
   if (topExists)
   {
      // exists in top layer, use it
      return lowerFcn(topPath, args);
   }
   else
   {
      if (is WhiteOut)
        {
           // it's white out on top, FAIL
           return - ENOENT;
        }
        else
        {
           GetBottomPathState(path, NULL, &bottomExists, NULL, &bottomPath);
           if (bottomExists)
           {
             // doesn't exist on top, exists on bottom, use it
           return lowerFcn(bottomPath, args);
           }
           else
           {
           // doesn't exist on top or bottom
             return - ENOENT;
           }
        }
     }
   }
 }
*/
```

*FIG. 21*

```
/* GROUP 2: ════════════════════════════════════
Operations on file that must not exist. Operation create the file.
mknod
mkdir Semantics:
fcn (path, args)
{
  GetTopPathState(path, &topMatchLen, &topExists, &isWhiteOut, &topPath);
  if (topExists)
  {
    // exists in top layer, FAIL
        return EEXIST;
  }
  else
  {
    if (isWhiteOut)
        {
          // it's white out on top, remove without and perform operation
          DelWhiteOut(topPath);
          return lowerFcn(topPath, args);
        }
        else
        {
          GetBottomPathState(path, &bottomMatchLen, &bottomExists, NULL, &bottomPath);
          if (bottomExists)
          {
            // exists on bottom, FAIL
            return EEXIST;
          }
          else
          {
            // doesn't exist on top or bottom, create file on layer with deeper match
            if (topMatchLen>= bottomMatchLen)
            {
              return lowerFcn(topPath, args);
            }
            else
            {
              return lowerFcn(bottomPath, args);
            }
          }
        }
  }
}
*/
```

*FIG. 22*

```
/* GROUP 3:  ════════════════════════════════
Operations on file if it exists, file created if it doesn't.
open
write Semantics:
fcn (path, args)
{
  GetTopPathState(path, &topMatchLen, &topExists, &isWhiteOut, &topPath);
  if (topExists)
  {
    // exists in top layer, use it
        return lowerFcn(topPath, args);
  }
  else
  {
    if (isWhiteOut)
        {
          // it's white out on top, remove without and perform operation
          DelWhiteOut(topPath);
          return lowerFcn(topPath, args);
        }
        else
        {
          GetBottomPathState(path, &bottomMatchLen, &bottomExists, NULL, &bottomPath);
          if (bottomExists)
          {
            // exists on bottom, use it
            return lowerFcn(bottomPath, args);
          }
          else
          {
            // doesn't exist on top or bottom, create file on layer with deeper match
            if (topMatchLen >= bottomMatchLen)
            {
              return lowerFcn(topPath, args);
            }
            else
            {
              return lowerFcn(bottomPath, args);
            }
          }
        }
  }
}
*/
```

*FIG. 23*

METHOD AND APPARATUS FOR MANAGING FILE SYSTEMS AND FILE-BASED DATA STORAGE

RELATED APPLICATIONS

This application is a divisional of U.S. patent application Ser. No. 10/630,339 filed Jul. 30, 2003, now U.S. Pat. No. 7,610,329 entitled "Method and Apparatus for Managing File Systems and File-Based Data Storage" by Jeff G. Bone, Brett A. Funderburg, A. Paul Jimenez and Laura Arbilla, which claims priority under 35 U.S.C. §119(e) to U.S. Provisional Patent Application No. 60/399,828 filed Jul. 30, 2002, entitled "Union Filesystem with Write-Through Semantics" by Jeff G. Bone, Laura Arbilla, and A. Paul Jimenez; U.S. Provisional Patent Application No. 60/399,723 filed Jul. 30, 2002, entitled "N-Tier Network Filesystem Middleware" by Jeff G. Bone; U.S. Provisional Patent Application No. 60/399,879 filed Jul. 30, 2002, entitled "Filesystem Mount Manager with Stack Mounting" by Jeff G. Bone, Brett A. Funderburg, and A. Paul Jimenez; U.S. Provisional Patent Application No. 60/399,872 filed Jul. 30, 2002, entitled "Filesystem Statistical Warehouse" by Laura Arbilla, and Brett A. Funderburg; U.S. Provisional Patent Application No. 60/399,830 filed Jul. 30, 2002, entitled "Filesystem Middleware with Selective Delegation" by Jeff G. Bone; and U.S. Provisional Patent Application No. 60/399,831 filed Jul. 30, 2002, entitled "Programmable Filesystem with Active Rules and Policies" by Jeff G. Bone, A. Paul Jimenez, and Laura Arbilla, each of which are fully incorporated by reference herein.

TECHNICAL FIELD

The present invention relates generally to systems and methods for managing and controlling data storage resources. More specifically, embodiments of the present invention provide methods and systems for providing, accessing, maintaining, automating, and controlling filesystems and file-based data storage.

BACKGROUND

Today's computers require memory to hold or store both the steps or instructions of computer programs and the data that those programs take as input or produce as output. This memory is conventionally divided into two types, primary storage and secondary storage. Primary storage is that which is immediately accessible by the computer or microprocessor, and is typically though not exclusively used as temporary storage. It is, in effect, the short term memory of the computer. Secondary storage is the long-term computer memory. This form of memory maintains information that must be kept for a long time, and may be orders of magnitude larger and slower. Secondary memory is typically provided by devices such as magnetic disk drives, optical drives, and so forth. These devices present to the computer's operating system a low-level interface in which individual storage subunits may be individually addressed. These subunits are often generalized by the computer's operating system into "blocks," and such devices are often referred to as "block storage devices."

Block storage devices are not typically accessed directly by users or (most) programs. Rather, programs or other components of the operating system organize block storage in an abstract fashion and make this higher-level interface available to other software components. The most common higher-level abstraction thus provided is a "filesystem." In a filesystem, the storage resource is organized into directories, files, and other objects. Associated with each file, directory, or other object is typically a name, some explicit/static metadata such as its owner, size, and so on, its contents or data, and an arbitrary and open set of implicit or "dynamic" metadata such as the file's content type, checksum, and so on. Directories are containers that provide a mapping from directory-unique names to other directories and files. Files are containers for arbitrary data. Because directories may contain other directories, the filesystem client (human user, software application, etc.) perceives the storage to be organized into a quasi-hierarchical structure or "tree" of directories and files. This structure may be navigated by providing the unique names necessary to identify a directory inside another directory at each traversed level of the structure. Hence, the organizational structure of names is sometimes said to constitute a "filesystem namespace."

Conventional filesystems support a finite set of operations (such as create, open, read, write, close, delete) on each of the abstract objects which the filesystem contains. For each of these operations, the filesystem takes a particular action in accordance with the operation in question and the data provided in the operation. The sequence of these operations over time affects changes to the filesystem structure, data, and metadata in a predictable way. The set of filesystem abstractions, operations, and predictable results for particular actions is said to constitute a "semantic" for the filesystem.

In some cases, a storage resource is accessed by a computer over a network connection. Various mechanisms exist for allowing software or users on one computing device to access storage devices that are located on another remote computer or device. While there are several remote storage access facilities available, they generally fall into one of two classes: block-level; and file-level. File-level remote storage access mechanisms extend the filesystem interface and namespace across the network, enabling clients to access and utilize the files and directories as if they were local. Such systems are therefore typically called "network file system." One Example of this type of storage access mechanism is the Network File System ("NFS") originally developed by Sun Microsystems. Note that the term "network file system" is used herein generally to refer to all such systems and the term "NFS" will be used when discussing the Sun Microsystems developed Network File System.

Networked file systems enable machines to access the filesystems that reside on other machines. Architecturally, this leads to the following distinctions. In the context of a given filesystem, one machine plays the role of a filesystem "origin server" (alternatively either "fileserver" or simply "server") and another plays the role of a filesystem client. The two are connected via a data transmission network. The client and server communicate over this network using standardized network protocols. The high-level protocols which extend the filesystem namespace and abstractions across the network are referred to as "network filesystem protocols." There are many such protocols, including the Common Internet File System or CIFS, the aforementioned NFS, Novell's Netware filesharing system, Apple's Appleshare, the Andrew File System (AFS), the Coda Filesystem (Coda), and others. CFS and NFS are by far the most prevalent. All of these network filesystem protocols share approximately equivalent semantics and sets of abstractions, but differ in their details and are noninteroperable. In order to use a filesystem from some fileserver, a client must "speak the same language," i.e., have software that implements the same protocol that the server uses.

A fileserver indicates which portions of its filesystems are available to remote clients by defining "exports" or "shares." In order to access a particular remote fileserver's filesystems, a client must then make those exports or shares of interest available by including them by reference as part of their own filesystem namespace. This process is referred to as "mounting" or "mapping (to)" a remote export or share. By mounting or mapping, a client establishes a tightly coupled relationship with the particular file server. The overall architecture can be characterized as a "two-tier" client-server system, since the client communicates directly with the server which has the resources of interest to the client.

Current network file system architectures suffer several shortcomings. In large network settings (e.g., those with large numbers of clients and servers), the architecture itself creates administrative problems for the management and maintenance of filesystems. The inflexibility of the two-tier architecture manifests itself in two distinct ways. First, the tight logical coupling of client and server means that changes to the servers (e.g., moving a directory and its [recursive] contents from one server to another) require changes (e.g. to the definitions of mounts or mappings) on all clients that access that particular resource, and thus must be coordinated and executed with care. This is a manual and error-prone process that must be continuously engaged and monitored by the system administrators that manage and maintain such networked filesystems. Second, the overall complexity of the environment grows at a non-linear rate. The complexity of a system of networked filesystem clients and servers can be characterized by the total number of relationships (mounts, mappings) between clients and servers, i.e. it grows as / is bounded by:

$$\{\{\{Complexity \sim = \# Clients \times \# Servers\}\}\}$$

Two-tier networked filesystems therefore ultimately fail to scale in an important sense—the overall cost of managing a networked filesystem environment is proportional to this complexity, and as the complexity grows the costs quickly become untenable. This can be referred to as "the mapping problem." The mapping problem may be understood as the direct result of an architectural deficiency in networked filesystem, namely the inflexibility of the two-tier architecture.

Existing attempts to address the problems of unconstrained complexity growth in the networked filesystem environment generally take one of two general forms: automation of management tasks; and minimization of the number of mounts through storage asset virtualization. The automation approach seeks to provide better administrative tools for managing network file storage. The virtualization approach takes two forms: abstraction; and delegation. The abstraction approach aggregates low-level storage resources across many servers so that they appear to be a single resource from a single server from a client's perspective. The delegation approach designates a single server as "owning" the filesystem namespace, but upon access by a client the delegation server instructs the client to contact the origin server for the resource in question to carry out the request. None of these approaches alone fully addresses the architectural deficiencies that cause complexity growth.

"Directory services" can be used to centralize the definition and administration of both lists of server exports and lists of mounts between clients and servers. Automation schemes can then allow clients to automatically lookup the appropriate server for a given filesystem in a directory service and mount the filesystem in its own namespace on demand.

Filesystem virtualization solutions to date have usually taken one of three forms: low-level gateways between networked block-level protocols and file-level protocols; delegation systems; and fully distributed filesystems. Low level gateways aggregate storage resources which are made available over the network in block (not file) form, and provide a filesystem atop the conjunction of block storage devices thus accessed. This provides some benefit in minimizing the number of exports and servers involved from a client perspective, but creates new complexity in that a new set of protocols (block-level storage protocols) is introduced and must be managed.

Delegation systems centralize namespace management in a single system—i.e., they make it appear that all the files are located on a single server—while actually redirecting each client request to a particular origin server. Delegation systems are relatively new and support for them must be enabled in new versions of the various filesystem protocols. Delegation systems allow a directory service to appear as a filesystem. One example is MicroSoft Corp.'s NT-DFS. Delegation systems typically do not map individual directories to individual directories. In other words, all the directories below a certain point in the filesystem namespace controlled by the delegation system are mapped to a single top-level directory. Another shortcoming is that prior art delegation systems typically respond to a request for a file or directory with the same response, regardless of the client making the request. As another deficiency, the underlying directory service does not handle requests directly, but redirects the requests to be handled by underlying systems.

Fully distributed filesystems employ distributed algorithms, caching, and so forth to provide a unified and consistent view of a filesystem across all participating machines. While addressing mount management to some extent, distributed filesystems introduce new and significant challenges in terms of maintaining consistency, increased sensitivity to failures, and increased implementation complexity. It should be noted that fully distributed filesystems typically require specialized protocols and software on every participant in the system, in effect making every computer involved both a client and a server. Other distributed filesystems seek to support mobile clients which frequently disconnect from the network, and thus focus on techniques for caching files and operations and ensuring consistency of the distributed filesystem upon reconnection.

Some prior art has focused on mechanisms for taking multiple filesystems and producing a merged logical view of those filesystems on a given filesystem client. This is sometimes referred to as "stack mounting." Stack mounting to date has been seen as a nondistributed mechanism. It is used by a client to organize and structure their own local filesystem namespace for various purposes, rather than being used to organize and manage a collection of network filesystems on an enterprise basis. Existing stacking filesystems are limited in an important way—among a collection of logically joined filesystems, a single origin filesystem is designated as the primary or "top" filesystem "layer" in the stack. All writes are performed on this filesystem layer. This has incorrectly been perceived as the only way to preserve the "correct" or traditional semantics of filesystems.

In addition to organizing and maintaining the relationships between filesystem clients and file servers, additional challenges exist in managing access to and utilization of filesystems. While most organizations have and enforce stringent document workflow and retention policies for their paper files, similar policies—while desired and mandated—are rarely enforced for electronic files. As a non-limiting example, many corporations have a policy that prohibits the usage of corporate storage capacity on fileservers for the storage of certain personal files and content types—for instance MP3s, personal digital images, and so on. This "policy" usually takes the form of a memo, email, etc. The administrators in charge of enforcing this policy face significant challenges. Conventional filesystems do not provide mechanisms for configuring a filesystem to only allow particular content types or otherwise automatically make decisions about what should be stored, where, and how. These conventional filesystems are static, and the set of semantics for access and other administrative controls are rather limited. Thus any such policy enforcement that happens is done retroactively and in an ad-hoc manner via manual or mostly-manual processes. The net result is that network file storage fills up with old, duplicated, and garbage files that often violate corporate and administrative utilization policies.

Filesystems are quasi-hierarchical collections of directories and files. The "intelligence" that a filesystem exhibits with respect to access control is typically restricted to a static set of rules defining file owners, permissions, and access control lists. To the extent even this relatively low level of "intelligence" exists, it is typically statically defined as a part of the filesystem implementation and may not be extended. Current file systems do not allow arbitrary triggers and associated activities to be programmed outside of the permissions hard coded in the original implementation of the filesystem.

Additional challenges exist for filesystem monitoring and reporting. Filesystem activity produces changes to the state of a filesystem. This activity can affect changes to the structure, the stored metadata, and the stored data of the directories and files. Generally speaking, this activity is not logged in any way. Rather, the filesystem itself holds its current state. Some filesystems—called "journaling" filesystems—maintain transient logs of changes for a short duration as a means of implementing the filesystem itself. These logs, however, are not typically organized in any way conducive to monitoring and reporting on the state of the filesystem and its evolutionary activity over time. These logs are typically not made available to external programs, but are instead internal artifacts of the filesystem implementation. Further, these logs are frequently purged and therefore provide a poor basis for reporting of historical and trend data.

A significant problem is that of collection, redaction, and analysis of high-level data about what a filesystem is being used for, what is stored in it, by whom and for what purpose. Solutions today involve software programs or users explicitly browsing through the filesystem structure, gathering the data required, and then analyzing it, acting on it or taking some other action based on the data. Collection of filesystem data proactively as operations occur is generally not done as it is generally not supported by the filesystem itself. Furthermore the accuracy of such collected data is questionable, as it reflects not an instantaneous state of the filesystem at any given moment but rather an approximate state of the filesystem over the duration of the run. Without collecting and maintaining the appropriate statistics as file operations occur, the data at the end of the run can not typically represent a correct and accurate picture of the contents of the filesystem at that time.

The problem of data collection and reporting is further compounded in the network filesystem environment. Because each server—indeed, each filesystem on each server—is a separate entity, it is therefore necessary to perform each data collection independently on each server. If reporting or monitoring is to be done across the network filesystem environment, significant challenges exist. Namely, because of the parallel and discrete nature of the collection runs, it becomes difficult to sensibly merge the collected data into a consistent snapshot of the state of the filesystem at some time.

SUMMARY

The present invention provides systems and methods for filesystem management that substantially eliminate or reduce disadvantages and problems associated with previously developed filesystem management systems and methods.

More specifically, one embodiment of the present invention can apply fully programmable rules to filesystem requests. This can be implanted, for example as a set of computer instructions stored on a computer readable medium and executable by a computer processor to: receive a filesystem request indicating a requested filesystem operation; compare the filesystem request to a programmable rulesbase to determine the filesystem request matches a pattern; and if the filesystem request matches a pattern, execute an action associated with the pattern. In one embodiment of the present invention, the patterns and actions can be fully programmable.

Another embodiment of the present invention can include a method of applying rules comprising: receiving a filesystem request indicating a requested filesystem operation; comparing the filesystem request to a programmable rulesbase to determine the filesystem request matches a pattern; and if the filesystem request matches a pattern, executing an action associated with the pattern.

Yet another embodiment of the present invention can include a product comprising a set of computer executable instructions stored on a computer readable medium, the set of computer instructions comprising a filesystem manager, a programmable rulesbase and a rules engine. The filesystem manager can: maintain a filesystem for an underlying storage medium; receive a filesystem request from a filesystem client that includes a requested filesystem operation; pass the filesystem request to a rules engine; and determine whether to proceed with the requested filesystem operation. The rules base can include a set of rules, with each rule comprising a pattern and an associated action. The rules engine can be operable to: receive the filesystem request; compare the filesystem request to the one more rules in the programmable rules base to determine if the filesystem request matches one or more rules from the set of rules based on the pattern for each rule; if there are one or more matching patterns, execute the action associated with each matching pattern; and return a rules engine response to the filesystem manager.

According to one embodiment of the present invention, a statistical warehouse can be maintained to track filesystem statistics of interest. Accordingly, one embodiment of the present invention can comprise a set of computer instructions stored on a computer readable medium and executable by a computer processor, the set of computer instructions comprising instructions executable to: receive a requested operation; gather a predefined set of metadata based on the requested operation; group the predefined set of metadata according to an attribute to generate one or more groups of metadata; and apply predefined heuristics to at least one of the groups of metadata to generate a statistic of interest. To prevent too much data from being stored, another embodiment of the present invention can further determine which pieces of the predefined metadata of interest in each of the one or more groups has been impacted by the application of the predefined heuristics and purge a particular group of metadata when each of the pieces of metadata of interest in the particular group has been impacted by the application of the predefined heuristics.

Yet another embodiment of the present invention can include: receiving a requested operation; gathering a predefined set of metadata based on the requested operation; grouping the predefined set of metadata according to an attribute to generate one or more groups of metadata; and applying predefined heuristics to at least one of the groups of metadata to generate a statistic of interest. Additionally, embodiments of the present invention can further include determining which pieces of the predefined metadata of interest in each of the one or more groups has been impacted by the application of the predefined heuristics and purging a particular group of metadata when each of the pieces of metadata of interest in the particular group has been impacted by the application of the predefined heuristics.

According to another embodiment of the present invention, a product can comprise a set of computer instructions stored on a computer readable medium and executable by a computer processor, the set of computer instructions comprising instructions executable to: receive a requested operation; gather a predefined set of metadata based on the requested operation; store the set of predefined metadata as a set of records correspond to one or more tables, wherein each records contains a piece of metadata of interest and wherein each record is associated with a group of one or more groups; apply predefined heuristics to at least a portion of the set of records associated with a particular group to generate a statistic of interest. Additionally, the computer instructions can be executable to associate a list of table names to the particular group based on the grouping attribute; and determine when a particular table corresponding to a particular table name in the list of table names has been impacted by one or more of the predefined heuristics based on a list of records impacted by the one or more predefined heuristics. Moreover, the computer instructions can be executable to determine when all the tables corresponding to all the table names in the list of table names have been impacted by the one or more of the predefined heuristics; and when all the tables corresponding to all the table names in the list of table names have been impacted by the one or more of the predefined heuristics, purge all records corresponding to the particular group.

According to yet another embodiment of the present invention, a method of managing a statistical warehouse can be provided that comprises: receiving a requested operation; gathering a predefined set of metadata based on the requested operation; storing the set of predefined metadata as a set of records correspond to one or more tables, wherein each records contains a piece of metadata of interest and wherein each record is associated with a group of one or more groups; and applying predefined heuristics to at least a portion of the set of records associated with a particular group to generate a statistic of interest. Additionally, the method can include associating a list of table names to the particular group based on the grouping attribute and determining when a particular table corresponding to a particular table name in the list of table names has been impacted by one or more of the predefined heuristics based on a list of records impacted by the one or more predefined heuristics. In addition, one embodiment of the present invention can include determining when all the tables corresponding to all the table names in the list of table names have been impacted by the one or more of the predefined heuristics and when all the tables corresponding to all the table names in the list of table names have been impacted by the one or more of the predefined heuristics, purging all records corresponding to the particular group.

Yet another embodiment of the present invention can include a system comprising a network, a plurality of client computers, a plurality of servers and an intermediary device. Each client computer can comprise a client processor, a client network interface to connect to and interface with the network, a client computer readable medium accessible by the client processor, storing a client program executable by the client processor to generate a first filesystem request and receive a first filesystem response. The intermediary device can comprise an in intermediary processor, an intermediary network interface to connect to and interface with the network and an intermediary computer readable medium accessible by the intermediary processor and executable to: provide a client-facing filesystem interface; provide a server-facing filesystem interface; receive the first filesystem request from a requesting client according to the client-facing filesystem interface; pass the first filesystem request to a server as a proxy request according to the server-facing filesystem interface; receive a server response from the server according to the server facing interface; and pass the server response to the requesting client as the first filesystem response. Each server can further comprise: a server processor; a server interface coupled to the server processor to connect to and interface with the network; a server computer readable medium storing a server program executable by the server processor to: provide an origin filesystem; receive the proxy request from the intermediary device; execute a requested operation; generate the server response; and communicate the server response to the intermediary computer. The intermediary program can be further operable to stack organize the origin filesystems, provide write-through semantics, provide whiteout flags, and provide redirection.

According to another embodiment of the present invention, an intermediary device can be provided. The intermediary device can comprise a processor, a network interface to connect to and interface with a network and a computer readable medium accessible by the processor and executable to: provide a client-facing filesystem interface; provide a server-facing filesystem interface; receive a filesystem request from a requesting client according to the client-facing filesystem interface; pass the filesystem request to a server as a proxy request according to the server-facing filesystem interface; receive a server response from the server according to the server-facing interface; and pass the server response to the requesting client as a proxy response.

Yet another embodiment of the present invention can include a device comprising a set of computer instructions stored on a computer readable medium executable by a computer processor, said set of computer instructions comprising instructions executable to: provide a client-facing filesystem interface; provide a server-facing filesystem interface; receive a filesystem request from a requesting client according to the client-facing filesystem interface; pass the filesystem request to a server as a proxy request according to the server-facing filesystem interface; receive a server response from the server according to the server-facing interface; and pass the server response to the requesting client as a proxy response.

According to yet another embodiment of the present invention a method can be provided that comprises: providing a client-facing filesystem interface; providing a server-facing filesystem interface; receiving a filesystem request from a requesting client according to the client-facing filesystem interface; passing the filesystem request to a server as a proxy request according to the server-facing filesystem interface; receiving a server response from the server according to the server-facing interface; and passing the server response to the requesting client as a proxy response.

Embodiments of the present invention provide an advantage over prior art systems and methods of filesystem management by providing fully programmable rules that can be applied to filesystem requests. This allows the automated and proactive enforcement of administrative policies regarding filesystem unitization (e.g., controlling types of data that can be saved/downloaded), access control and security and so on. Moreover, as would be understood by one of ordinary skill in the art, because the rules are programmable, sophisticated provisioning, storage routing and new filesystem applications can be implemented. Additionally, this can allow a system administrator to define rules, such as no .mp3 files, and have those rules enforced by the filesystem.

Embodiments of the present invention provide yet another advantage over prior art systems and methods of filesystem management by allowing the automated transformation and archival of static log data about filesystem activity into dynamically maintained, user definable time series data about filesystem statistics of interest. Embodiments of the present invention provides advantages over prior art systems because, in traditional filesystem logging techniques, the collection and storage of filesystem metadata becomes untenably burdensome because the logs grow quickly and consume a large amount of storage capacity. Embodiments of the present invention, on the other hand, provide the ability to both collect filesystem metadata and dynamically redact or "historize" it to allow ongoing filesystem statistics to be maintained while reducing the required amount of storage capacity.

Embodiments of the present invention can provide yet another advantage over prior art systems and method of filesystem management by providing an n-tier architecture. This can decouple the filesystem clients from the servers and insulates them from changes that occur to the structure and organization of the origin filesystem.

Embodiments of the present invention provide yet another advantage over prior art systems and methods of filesystem management by providing write-through semantics to stack organized origin filesystems. This can allow changes made based on the stack organized filesystem to be propagated to the proper underlying origin filesystem.

BRIEF DESCRIPTION OF THE FIGURES

For a more complete understanding of the present invention and the advantages thereof, reference is now made to the following description taken in conjunction with the accompanying drawings in which like reference numerals indicate like features and wherein:

FIG. 20 illustrates example pseudocode for operation with write-through semantics and whiteouts in which the file upon which an operation is to occur exists;

FIG. 21 illustrates example pseudocode for operation with write-through semantics and whiteouts in which the file upon which an operation is does not exist;

FIG. 22 illustrates example pseudocode for performing an operation that can act on an existing file or create a file if the file does not exist;

FIG. 23 illustrates example pseudocode for operations for which a file exits, in which the operation removes the file.

DETAILED DESCRIPTION

Embodiments of the present invention can comprise systems and methods for managing filesystems and can provide a programmable filesystem with active rules and policies, an n-tier network filesystem, a stack organized filesystem, a union filesystem with write-through semantics, a filesystem middleware with selective delegation, a filesystem with a statistical warehouse and/or other management functionality. This application incorporates by reference U.S. Provisional Patent Application No. 60/399,828 filed Jul. 30, 2003, entitled "Union Filesystem with Write-Through Semantics" by Jeff G. Bone, Laura Arbilla, and A. Paul Jimenez; U.S. Provisional Patent Application No. 60/399,723 filed Jul. 30, 2002, entitled "N-Tier Network Filesystem Middleware" by Jeff G. Bone; U.S. Provisional Patent Application No. 60/399,879 filed Jul. 30, 2002, entitled "Filesystem Mount Manager with Stack Mounting" by Jeff G. Bone, Brett A. Funderburg, and A. Paul Jimenez; U.S. Provisional Patent Application No. 60/399,872 filed Jul. 30, 2002, entitled "Filesystem Statistical Warehouse" by Laura Arbilla, and Brett A. Funderburg; U.S. Provisional Patent Application No. 60/399,830 filed Jul. 30, 2002, entitled "Filesystem Middleware with Selective Delegation" by Jeff G. Bone; and U.S. Provisional Patent Application No. 60/399,831 filed Jul. 30, 2002, entitled "Programmable Filesystem with Active Rules and Policies" by Jeff G. Bone, A. Paul Jimenez, and Laura Arbilla.

Figure 1:
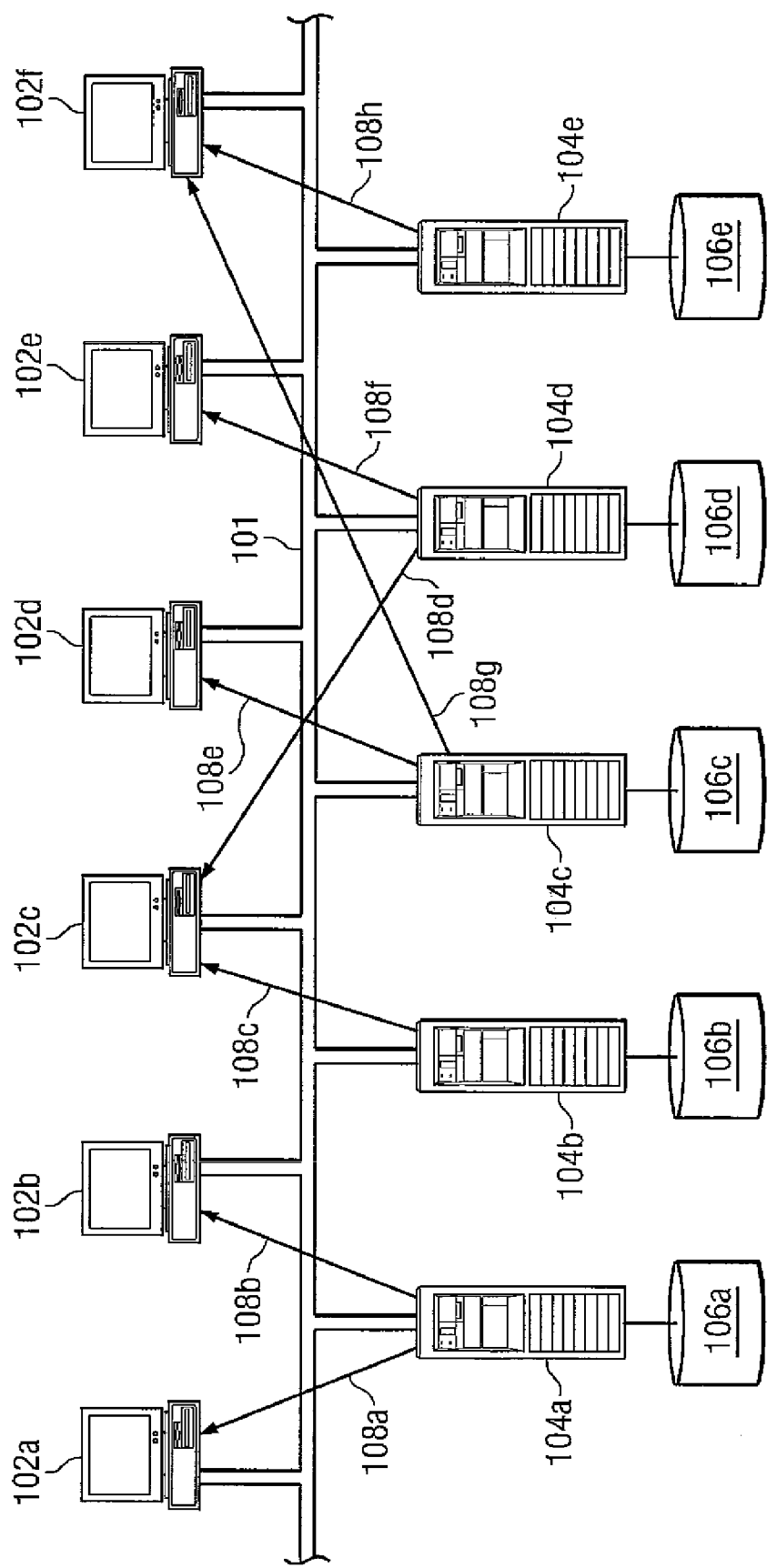
FIG. 1 is a diagrammatic representation of a two-tier network in which filesystem management can be implemented according to embodiments of the present invention.

FIG. 1 is a diagrammatic representation of a two-tier network in which filesystem management can be implemented according to embodiments of the present invention. A data network 101 (e.g., a LAN, a WAN, the internet, a wireless network or other network known in the art) connects a number of clients 102a-102f to a number of servers 104a-104e. The servers 104a-104 are each connected to one or more storage media devices 106a-106e (e.g., hard drives, tape drives, disk drives or other storage media device known in the art). Each storage media device can have its own filesystem and the network filesystem itself is represented by the connection or "mounts" 108a-108h. Each of mounts 108a-108h is a logical (rather than physical) connection between the associated server and client computer. More precisely, each mount is the logical relationship between all or some part of the relevant filesystems presented by the associated server and shared out over network 121 according to a network filesystem protocol. For example, mount 108a represents the logical relationship between all or part of the filesystem of storage media device 125a that server 104a shares over network 101 with, for example, client 102a.

Figure 2:
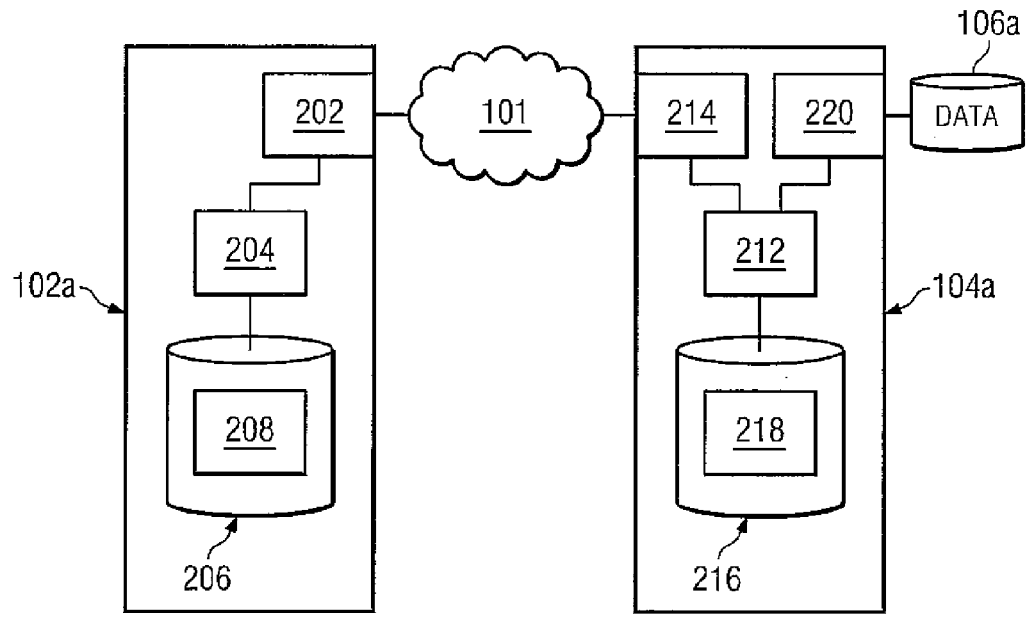
FIG. 2 is a diagrammatic representation of the portion of network that includes a client, a server, and a storage media device.

FIG. 2 is a diagrammatic representation of the portion of network 101 that includes client 102a, server 104a and storage media device 106a. In one embodiment of the present invention, client 102a can include a processor 202, a communications interface device 204 (internal or external modem, Ethernet interface and/or any other network interface known in the art) coupled to processor 202 to connect to and interface with network 101, an a computer readable storage medium 206 (e.g., RAM, ROM, optical disk, magnetic storage medium and/or any other computer readable storage medium) coupled to processor 202 storing a set of computer readable instructions 208 ("client program 208") executable by processor 202. Client 102a can include other computer components known in the art.

Similarly, server 104a can include a processor 212, a network interface device 214 coupled to processor 212 to connect to and interface with network 101, and a computer readable storage medium 216 (e.g., RAM, ROM, optical disk, magnetic storage medium and/or any other computer readable storage medium) coupled to processor 212 storing a set of computer readable instructions 218 ("server program 218") executable by processor 212. Server 104a can also be coupled to an attached storage media device 106a via a second communications interface 220 (e.g., Ethernet connection, internal or external modem or other interface known in the art) and can maintain a filesystem for storage media device 106a.

Figure 3:
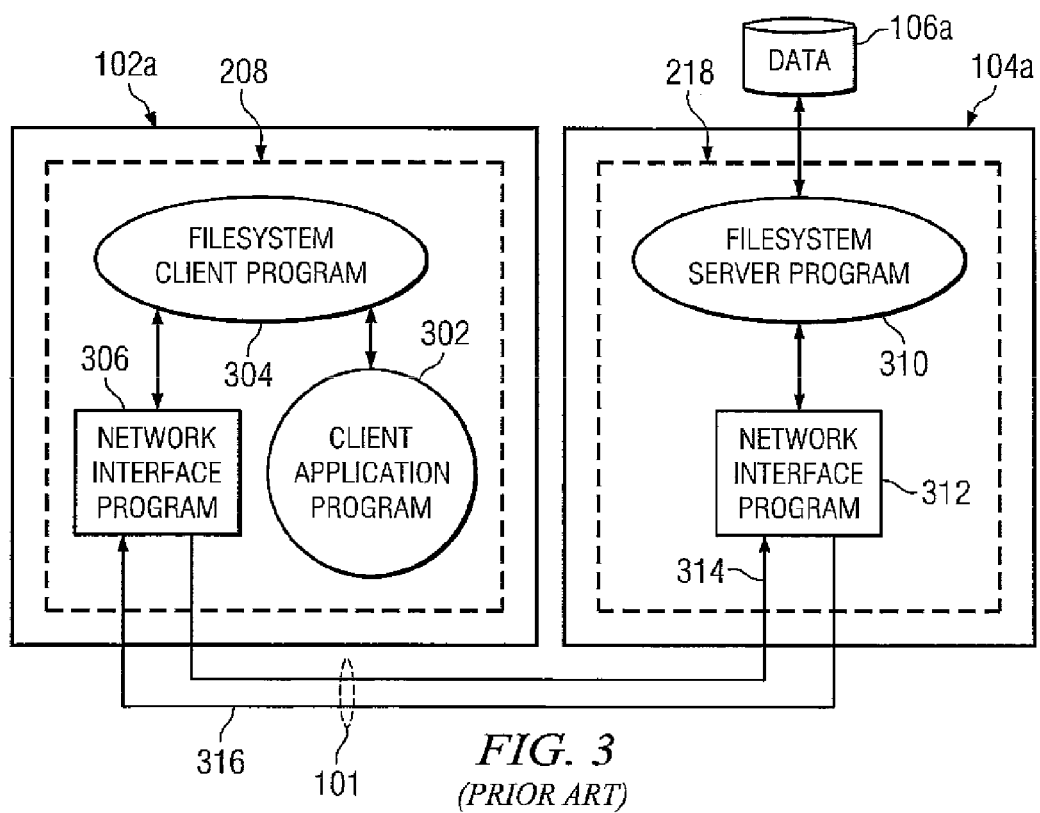
FIG. 3 is a diagrammatic representation of one embodiment of the interactions between the client-server pair of FIG. 2 using a conventional software architecture.

FIG. 3 is a diagrammatic representation of one embodiment of the interactions between the client-server pair of FIG. 2 using a conventional software architecture. Client program 208 at client 102a can, in one embodiment of the present invention, include a client application program 302, a filesystem client program 304 and a network interface program 306. Although shown as subprograms of an overarching client program 208 in FIG. 3, filesystem client program 304, client application program 302 and network interface program 306 can be implemented as separate programs, modules of the same program or in any other suitable programming manner, as would be understood by those of ordinary skill in the art. Server program 218 at server 104a can include a filesystem management program 310 and a network interface program 312. Filesystem management program 310 can provide the filesystem for storage media device 106a. In other words, filesystem manager 310 can implement a filesystem for the associated media storage device to represent the block level storage on storage media device 106a. Filesystem management program 310 and network interface program 312 can be implemented as a single program, modules of the same program, separate programs or in any other suitable programming manner, as would be understood by those of ordinary skill in the art.

Client program 208 and management program 218 communicate over network 101 by exchanges of filesystem requests (represented by line 314) and filesystem responses (represented by line 316). The mechanism by which such an exchange occurs are known as the network filesystem protocol. Embodiments of the present invention can employ any network filesystem protocol known in the art. When client application program 302 wishes to access a media storage device, client application can generate a request to access the storage device. Filesystem client program 304 can intercept the request and direct it over network 101 (e.g., through network interface program 306), thus generating filesystem request 314. Network interface program 312 can receive the request and direct it to filesystem management program 310, which can then perform the requested operation on data 311. Upon completion of this operation, filesystem server 310 can construct response 316 and direct it back to client program 208 by way network 101. Network interface program 306 receives this response and directs it to filesystem client program 304, which in turn responds to waiting client application program 302, thus completing the transaction.

Figure 4:
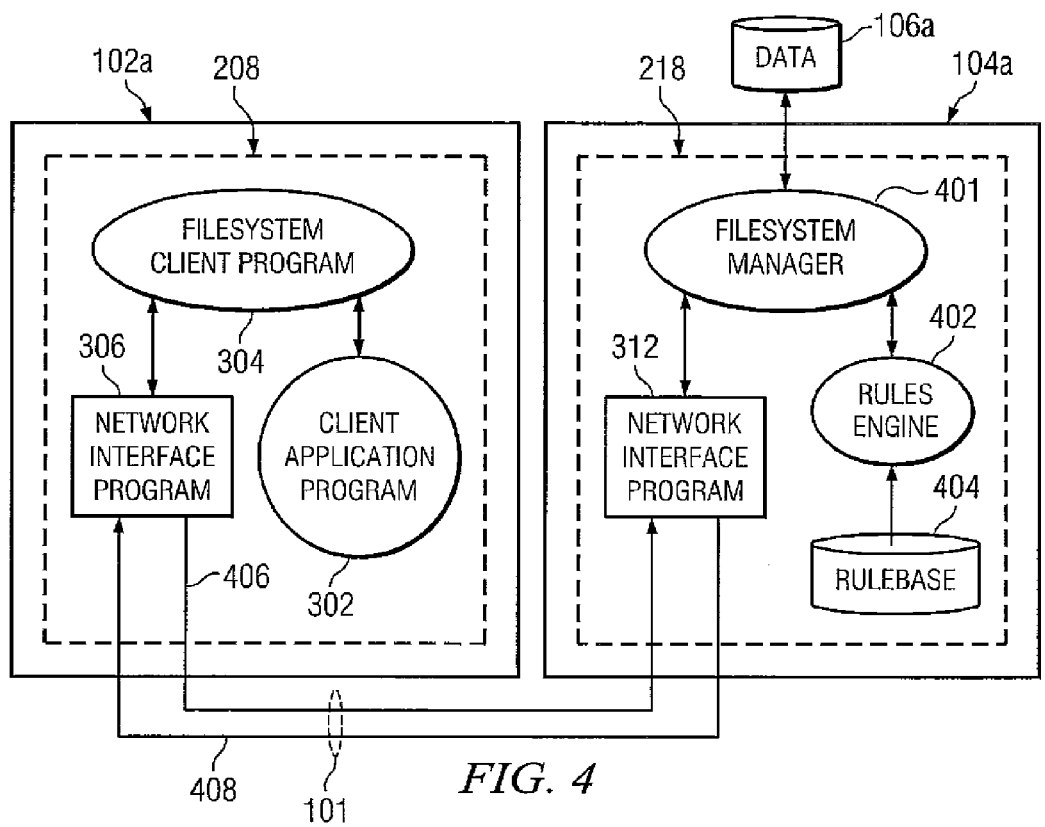
FIG. 4 is a diagrammatic representation of the interactions between the client-server pair of FIG. 2 that can employ active rules and policies according to one embodiment of the present invention.

FIG. 4 is a diagrammatic representation of the interactions between the client-server pair of FIG. 2 that can employ active rules and policies. Client program 208 at client 102a can, in one embodiment of the present invention, include a client application program 302, a filesystem client program 304 and a network interface program 306. Although shown as subprograms of an overarching client program 208 in FIG. 4, filesystem client program 304, client application program 302 and network interface program 306 can be implemented as separate programs, modules of the same program or in any other suitable programming manner, as would be understood by those of ordinary skill in the art.

Server program 218 at server 104a can include a filesystem manager 401, a network interface program 312 and a rules engine 402 that can access a rules base 404. While shown as a local to filesystem management program 401 in FIG. 4, rules engine 402 and rule base 404 can be remote from filesystem manager 401. Furthermore, filesystem manager 401, network interface program 312, and rules engine 402 can be implemented as a single program, modules of the same program, separate programs or in any other suitable programming manner, as would be understood by those of ordinary skill in the art. Rules engine 402 and filesystem management program 310 can communicate via any appropriate interprocess protocol (e.g., COM, CORBA, etc.) or remote procedure protocol (e.g., PRCs, DCOM, CORBA, SOAP, HTTP, etc.), as would be understood by those of ordinary skill in the art. Additionally, it should be noted that filesystem manager 401 and filesystem client program 304 (or other program making filesystem requests) can be implemented locally.

Filesystem manager 401 can provide a filesystem for storage media device 106a. In other words, filesystem manager 401 can present a filesystem interface to filesystem clients and implement the appropriate interfaces and integrations necessary to communicate with and manage data storage on an underlying storage medium (e.g., media storage device 106a). When client application program 302 wishes to access media storage device 106a, client application can generate an access request. Filesystem client program 304 can intercept the request and direct it over network 101 (e.g., through network interface program 306), thus generating filesystem request 406. Network interface program 312 can receive the request over network 101 and direct it to filesystem manager 401. The filesystem request can include a requested operation and the data, such as a file, upon which the operation is to take place. In one embodiment of the present invention, when filesystem manager receives the filesystem request from filesystem client program 304, filesystem manager 401 can pass the requested operations and/or data affected by the operation (e.g., files) to rules engine 402 which can compare them against rule base 404. Rules engine 402 determines which, if any, of the rules in programmable rules base 404 specify a pattern that matches the requested operation and/or the data upon which the operation is to take place. Rules engine 402 can then either execute any actions associated with matching rule or defer the execution of the action by an arbitrarily defined time interval.

Rules engine 402 can then respond to filesystem manager 401. If rules engine 402 executed an action based on a rule, the response may be the result of that action. Based on the rules engine response, filesystem manager 401 can determine whether to continue with the operation requested by filesystem client program 304 or terminate the operation. If filesystem manager 401 proceeds, filesystem manager 401 can perform the requested operation on the underlying storage medium and return a filesystem response 408. File operations from the filesystem request can be synchronously or asynchronously compared against programmable rules base 404 to determine if any actions need to be taken based on a rule. The actions can be arbitrarily defined and, thus, the aggregate behavior of the filesystem provided by filesystem manager 401 can be determined by rules that are defined for it.

Figure 5:
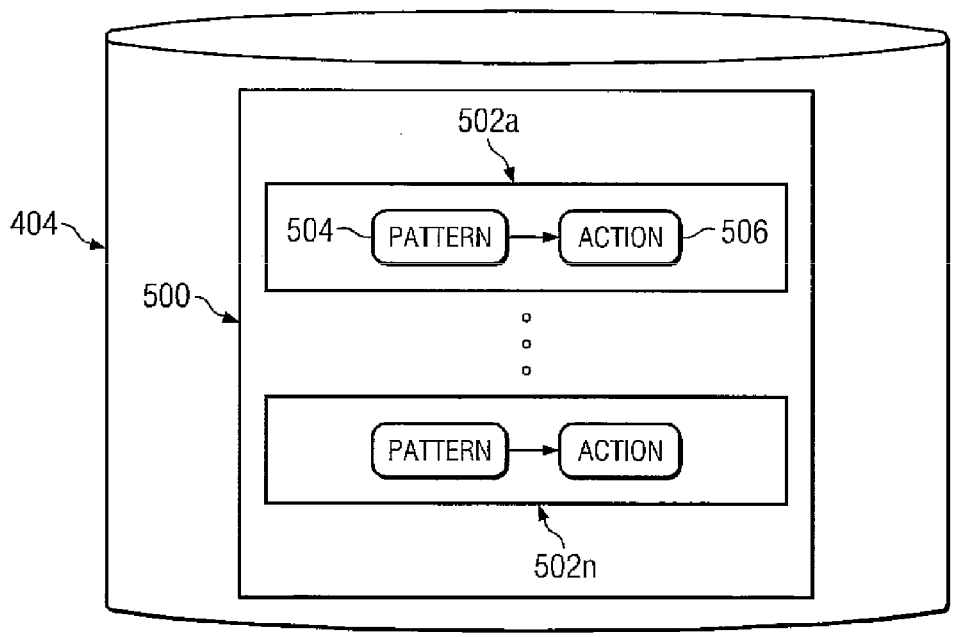
FIG. 5 is a diagrammatic representation of one embodiment of a rules base.

FIG. 5 is a diagrammatic representation of one embodiment of a rules base such as rules base 404 of FIG. 4. Rules base 404 can include a rules set 500 that contains one or more rules (e.g., rules 502a-502n). A pattern and an action can define each rule. For example, pattern 504 and action 506 define rule 502a. Patterns can define to which filesystem operations and/or data in an underlying storage medium an action applies. For example, pattern 504 can define that action 506 should occur if a request to write data to particular blocks is received. Any arbitrary criteria can be used to define pattern 504, such as, for example, the operation to be performed, the data on which the operation is to be performed, metadata associated with the file or data affected by the operation, the client from which the filesystem request was received or any other criteria. Action 506 can be an arbitrarily complex action and can include, for example, modifying the data in the underlying storage medium, returning an error to the filesystem management program or any other action.

Action 506 can occur in-band or out-of-band. In-band actions can happen generally synchronously with the requested operation and may affect the success or failure of the operation or modify it a predefined manner. Out-of-band actions, on the other hand, can occur asynchronously with respect to the requested operation and do not impact the success or failure of the operation, but may modify the state of the data in the underlying storage medium (e.g., media storage device 106a) or take other arbitrary action subsequent to the completion of the requested operation.

Figure 6:
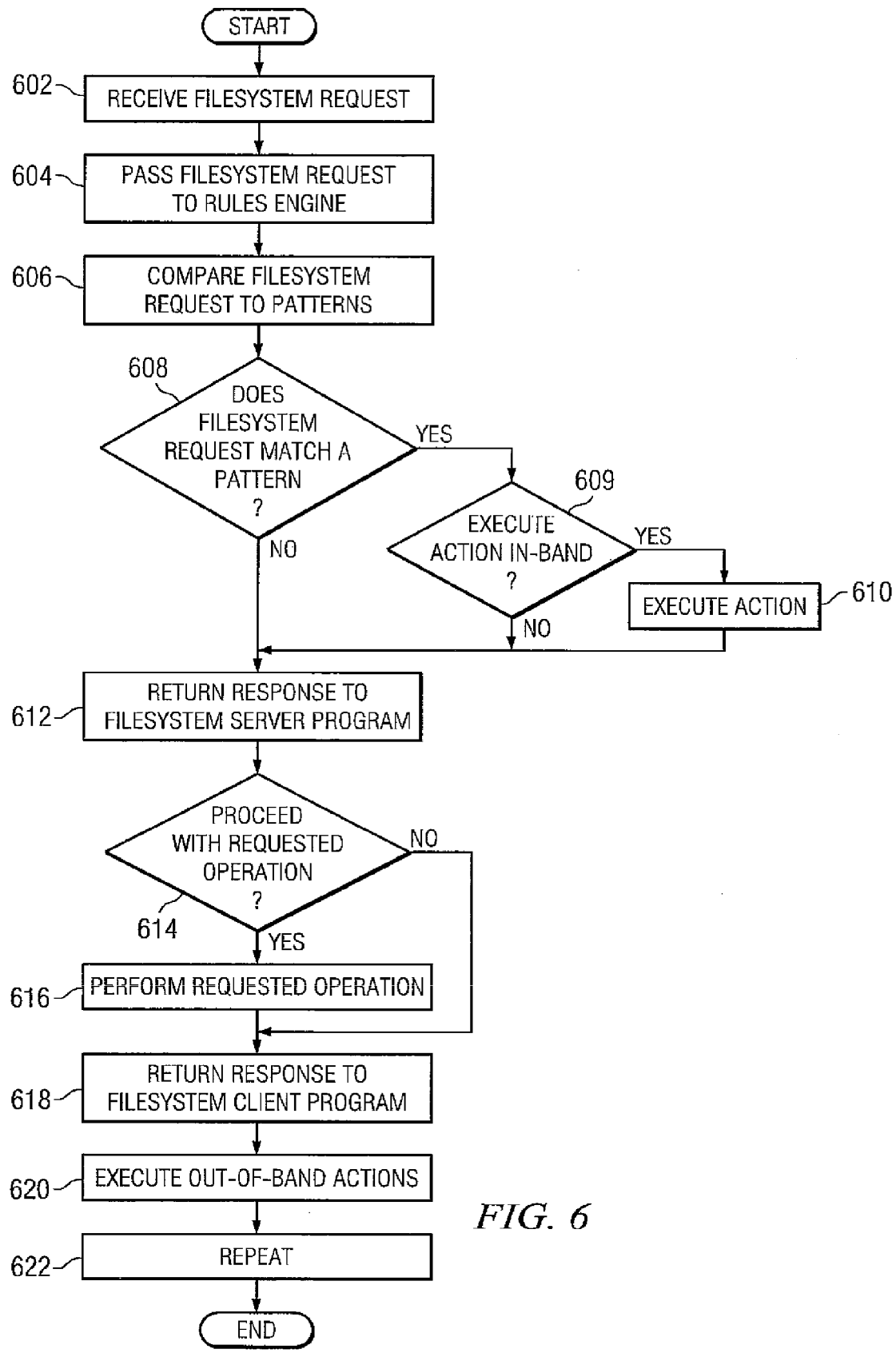
FIG. 6 is a flow chart illustrating one embodiment of a method for implementing rules.

FIG. 6 is a flow chart illustrating one embodiment of a method for implementing rules. At step 602 a filesystem manager can receive a filesystem request from a filesystem client program that contains a requested operation and an indication of the data upon which the requested operation is to occur. For example, the filesystem server can receive a request to store a file (e.g., an .mp3 file) on an underlying storage medium. The filesystem manager, at step 604, can pass the request to a rules engine. Passing the request to the rules engine can include passing the request modified or unmodified to the rules engine or passing a set of filesystem metadata associated with the request to the rules engine. The rules engine, at step 606, can compare the filesystem request to one or patterns to determine if the filesystem request matches one or more defined rules. The patterns to which the filesystem request is compared can be arbitrarily defined and the patterns can specify that any attribute of the filesystem request can trigger an associated action. By way of example, but not limitation, a pattern can specify that a filesystem request requesting a particular operation, a filesystem request received from a particular filesystem client and/or a filesystem request to manipulate particular data can trigger an action. As a more specific example, a systems administrator can specify that no .mp3 files can be stored on the underlying storage medium.

If, at step 608, the rules engine determines that the filesystem request does not match a pattern, the rules engine can return a response to the filesystem manager (step 612). If, however, at step 608, the rules engine determines that the filesystem request does match a pattern, the rules engine can determine if the action associated with the pattern should be performed in-band. At step 610, the action can be executed by the rules engine. The action can be an arbitrarily complex action and can include for example, changing data in the underlying media storage device, changing the structure of the filesystem (e.g., changing directories or file names), generating errors, modifying the requested operation or any other programmable action. The rules engine can, at step 612, return a response to the filesystem manager that can be based on the actions.

Continuing with the previous example of saving an .mp3 file, the rules engine, at step 608, can determine that the request to save a .mp3 file matches the pattern for the no .mp3 file rule (e.g., the request contains the save operation and .mp3 data). At step 609, the rules engine can determine that an in-band the action of returning an error should occur in-band and can generate the error message at step 610. At step 612, the rules engine can return the error message to the filesystem system management program.

Based on the response from the rules engine, the filesystem manager can, at step 614, determine whether to proceed with the requested operation (either modified or unmodified by the rules engine). In one embodiment of the present invention, the determination of whether to perform a requested operation can be based on the response from the rules engine. Thus, for example, the rules engine can specify that an operation not take place because a the client program (or particular user) is not authorized to perform an operation. The filesystem manager can, on the other hand, perform the requested operation (step 616) and at step 618 return a filesystem reply to the filesystem client program, thus completing the filesystem transaction. Additionally, the filesystem manager can return a reply (step 618), such as an error, if the filesystem manager did not proceed with the requested operation (as determined at 616). In the previous example, the filesystem manager can determine that the operation of saving the .mp3 file should not continue based on the response from the rules engine and can send an error message to the filesystem client program in the filesystem response.

If, at step 609, the rules engine determines that an action was to be performed out-of-band, the rules engine can execute the action at step 620. Because the action is executed after the performance of the requested operation, performance of the action does not affect the success or failure or modify the requested operation. However, the out-of-band action can modify the state of the data in the underlying media storage device or take other arbitrary actions subsequent to the completion of the operation. For example, if the non .mp3 rule was a rule defining an out-of-band action (as determined at step 609), the action executed at step 620 can be, for example, to delete an .mp3 file saved on the underlying storage medium after the operation of saving the .mp3 occurred.

Embodiments of the present invention provide a system and method for programmable filesystem with active rules that can enable the automated and proactive enforcement of administrative policies regarding filesystem unitization (e.g., controlling types of data that can be saved/downloaded), access control and security and so on. Moreover, as would be understood by one of ordinary skill in the art, because the rules are programmable, sophisticated provisioning, storage routing and new filesystem applications can be implemented. Additionally, this can allow a system administrator to define rules, such as no .mp3 files, and have those rules enforced by the filesystem.

Embodiments of the present invention provide advantages over prior art filesystem systems and methods. In conventional filesystem systems and methods, particularly Microsoft®Windows based file systems, each file is associated with an access control list ("ACL") that contains a set of users or groups and the list of permissions associated with the users or groups. The permissions include items such as read, write, delete, append. In UNIX-based systems, each file is associated with the user and a group of users. For each file there typically is a read bit, write bit, and an execute bit. When a file system management program receives a file system request, in conventional systems, the filesystem management program will determine the user making the request and the permissions associated with that user either from the ACL or the permissions bits to determine if the operation can be performed. The permissions in conventional file system systems and methods generally define only a limited number of actions that can be taken through the filesystem. In other words the security features of conventional file systems are hard coded and the set of actions cannot be expanded beyond what is included in the original filesystem implementation. Embodiments of the present invention, on the other hand, allow administrators of the file system to program the file system behavior by programming arbitrary actions and associating those actions with patterns.

According to another embodiment of the present invention a filesystem statistical warehouse can be provided. Embodiments of the present invention and can collect and arbitrary, user defined set a file system statistics on the file system operations and or static or dynamic file system metadata. This collection may happen in either synchronously or asynchronously with filesystem activity. The collected data can be stored in an active statistical database. User-defined redaction methods can continuously filter and transform the statistical database to produce and maintain aggregate statistical values for the purpose monitoring on and reporting against file system capacity accesses utilization and so on.

Figure 7:
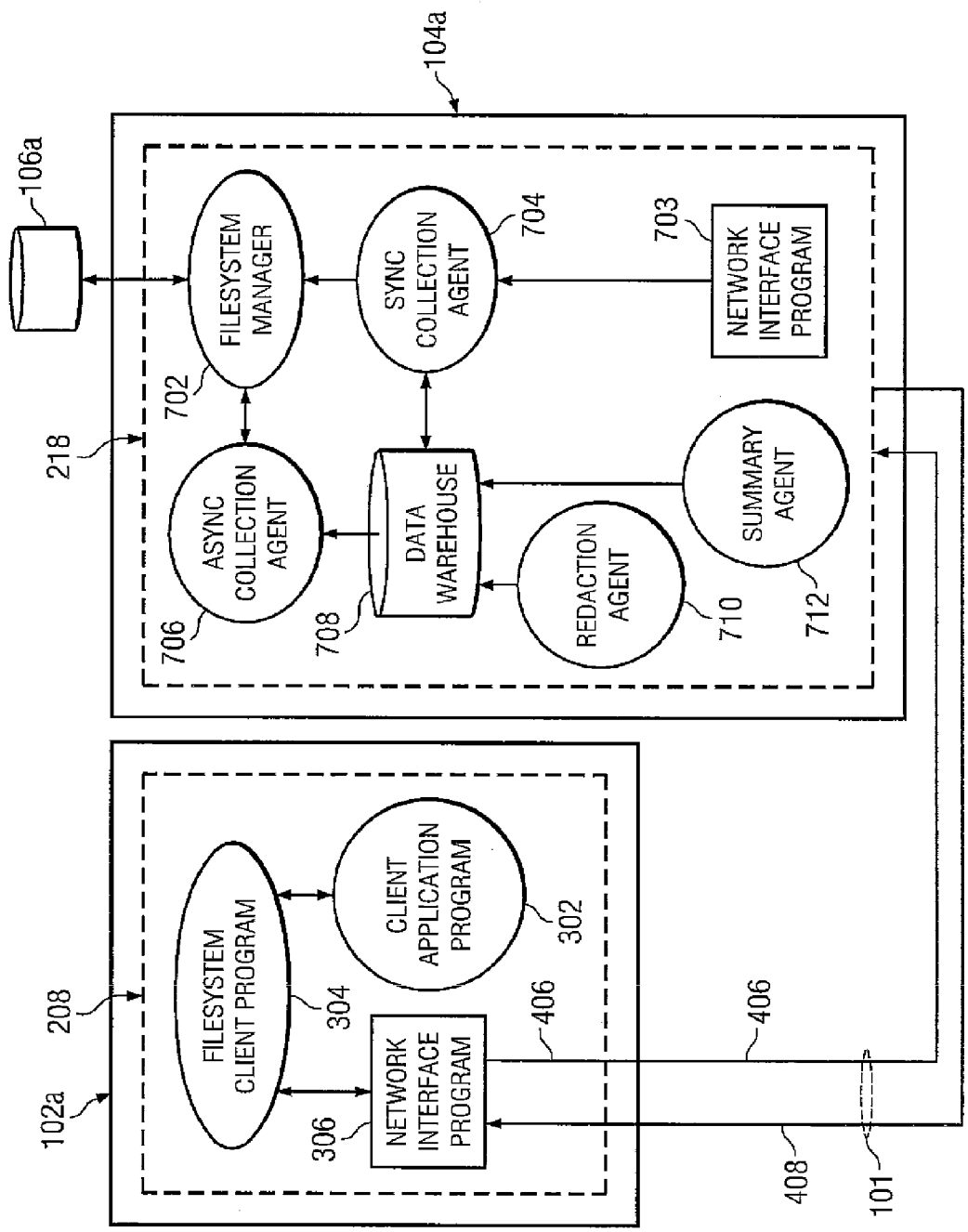
FIG. 7 is a diagrammatic representation of the interactions between the client-server pair of FIG. 2 that can employ a statistical warehouse according to one embodiment of the present invention.

FIG. 7 is a diagrammatic representation of the interactions between the client-server pair of FIG. 2 that can employ a statistical warehouse. Client program 208 at client 102a can, in one embodiment of the present invention, include a client application program 302, a filesystem client program 304 and a network interface program 306. Although shown as subprograms of an overarching client program 208 in FIG. 4, filesystem client program 304, client application program 302 and network interface program 306 can be implemented as separate programs, modules of the same program or in any other suitable programming manner, as would be understood by those of ordinary skill in the art.

Server program 218 at server 104a can include a filesystem manager 702, a network interface program 703, a synchronous collection agent 704, an asynchronous collection agent 706, a data warehouse 708, a redaction agent 710 and a summary agent 712. While shown as a local to filesystem management program 702 in FIG. 7, synchronous collection agent 704, asynchronous collection agent 706, data warehouse 708, redaction agent 710 and summary agent 712 can be remote from filesystem manager 702. Furthermore, filesystem manager 702, network interface program 703, synchronous collection agent 704, asynchronous collection agent 706, data warehouse 708, redaction agent 710 and summary agent 712 can be implemented modules of the same program, separate programs or in any other suitable programming manner, as would be understood by those of ordinary skill in the art. These components can communicate via any appropriate interprocess protocol (e.g., COM, CORBA, etc.) or remote procedure protocol (e.g., PRCs, DCOM, CORBA, SOAP, HTTP, etc.), as would be understood by those of ordinary skill in the art. Additionally, it should be noted that filesystem manager 401 and filesystem client program 304 (or other program making filesystem requests) can be implemented locally.

Filesystem manager 402 can provide a filesystem for storage media device 106a. In other words, filesystem manager 702 can present a filesystem interface to filesystem clients and implement the appropriate interfaces and integrations necessary to communicate with and manage data storage on an underlying storage medium (e.g., media storage device 106a). The filesystem can use filesystem metadata to catalog data represented by the filesystem. When client application program 302 wishes to access media storage device 106a, client application program 302 can generate an access request. Filesystem client program 304 can intercept the request and direct it over network 101 (e.g., through network interface program 306), thus generating filesystem request 706. Network interface program 312 can receive the request over network 101 and direct it to filesystem manager 702. The filesystem request can include a requested operation and the data, such as a file, upon which the operation is to take place.

In one embodiment of the present invention, synchronous collection agent 704 can gather a predefined set of filesystem metadata. The filesystem metadata can include any filesystem metadata associated with the data in the underlying storage medium that is affected by the requested operation, metadata that describes the requested operation or any user defined filesystem metadata that can be gathered from the filesystem. Within the gathered filesystem metadata will be one or more pieces of metadata of interest. That is, there will be one or pieces of metadata to which a heuristic will be applied to generate a statistic of interest. Synchronous collection agent 704 can store the filesystem metadata in data warehouse 708. Alternatively, asynchronous collection agent 706 can collect filesystem metadata asynchronously with filesystem operations (i.e., after an arbitrary time delay). Asynchronous collection of filesystem metadata can occur, in one embodiment of the present invention, according to a predefined schedule. The filesystem metadata entered at any given time, represents a snapshot of a filesystem statistic of interest. Depending on whether the filesystem metadata is entered by asynchronous collection agent 706 or synchronous collection agent 704, data warehouse 708 represents a time-varying view of the underlying file systems over continuous or discrete time intervals. Summary agent 712 can apply user-defined heuristics to the filesystem metadata to generate various filesystem statistics of interest and redaction agent 710 can integrate the filesystem statistics into a dynamically maintained time series.

As an example, assume data warehouse 708 is maintained as a database and each file within a set of files of interest (e.g., a set of files on storage medium 106a) is represented in data warehouse 708 by records in a set of tables. Furthermore, each attribute of a file is associated with a record in a separate table. That is, each attribute for a file is stored in a separate table and each file having that attribute is represented by a separate record. Table 1 is an example of various pieces of filesystem metadata that can be collected by or generated by synchronous collection agent 704 or asynchronous collection agent 706.

TABLE 1

| Table/Attribute of Interest | Fields | Value |
| --- | --- | --- |
| Path | fileID | (integer, key) |
|  | harvestID | (integer, fkey to Harvests) |
|  | parentPath | (integer, fkey to Strings) |
|  | localName | (integer, fkey to Strings) |
| Last Access Time | fileId | (integer, key) |
|  | harvestID | (integer, fkey into Harvests) |
|  | atime | (integer, a time value) |
| Harvests | harvestID | (integer, key) |
|  | time | (integer, a time value) |

In Table 1, each file of interest contains a Path and Last Access Time attribute that can be represented by the Path and Last Access Time tables. The Harvests attribute can be generated by the collection agent to record the time when a particular set of filesystem metadata was collected. Each record in the Path or Last Access Time tables sharing a common harvestID is, therefore, collected in the same run of the synchronous or asynchronous collection agent. The fields of fileID, parentPath, localName and atime can be collected from the filesystem metadata maintained by filesystem manager 702. Thus, based on an operation synchronous and/or asynchronous collection agents can gather predefined sets of filesystem metadata. For the sake of example, it will be assumed that there are two harvests: harvest1 and harvest2. In this case, the harvestID can act as an attribute to group the collected metadata into one or more groups. Each group can contain one or more pieces of filesystem metadata of interest and/or other metadata.

Table 2 represents an example summary table that can be generated by summary agent 712 to maintain a filesystem statistic of interest. In this case, the filesystem statistic of interest is last access time. This can based on the metadata of interest in the Harvest1 group "atime" from the Last Access Times Records.

TABLE 2

| LastAccessTimeSummary | |
| --- | --- |
| harvestID | (integer, key) |
| ageBucket | (a date interval, as in 0-7 days, 8-31 days, 32-90 days, 90-120 days, etc.) |

In this example, summary agent 712, given a time interval to target, can find the harvestIDs for all harvests that occurred during the interval from the harvestID table. Based on the harvestIDs, summary agent 712 can then find all the records associated with the harvest of interest (e.g., harvest1). In other words, the summary agent can find each of the pieces of metadata of interest associated with a particular attribute (e.g., the harvest1ID). Summary agent 712 can summarize the at least a portion of the metadata of interest in that group by applying predefined heuristics to one or more of the groups of metadata. For example, summary agent 712 can collect all of the LastAccessTime records associated with the harvest1. For each such record, summary agent 712 can allocate the record to an "age bucket" as defined by a heuristic by, for example, subtracting the metadata of interest "atime" value from each such record from the current time. For each record it identifies with a bucket, summary agent 712 can increment a count in the record LastAccessTimeSummary that is associated with the harvestID and age bucket. Thus, the harvest agent can apply the set of heuristics to the metadata of interest ("atime") in a particular group (e.g. "harvest1"). Summary agent 712 can then provide a list of metadata of interest to redaction agent 710. This can be done, for example, by providing a list of records that contain the metadata affected by the set of heuristics (i.e., by providing a list of records that contain the "atime" metadata and the harvest1 attribute).

Table 3 illustrates an example of a redactions table that can be maintained by redaction agent 710.

TABLE 3

| Redactions | |
| --- | --- |
| harvestID |  |
| purgeTime | (integer, a time value, default NULL) |
| dependencies | (an aggregate list of tables still directly using individual harvest records). |

Redaction agent 710 can operate as a "garbage collection" agent to remove metadata or records from data warehouse 708. Conventional garbage collection agents simply remove information as they receive records. This can lead to purging of information from a database while the information is still referentially live.

To avoid this, redaction agent 710 can maintain a table which includes first-class references indicating which meta data has been redacted by for example maintaining a list indicating which attribute table/harvest pairs have been redacted. Each record in the redactions table can, in one embodiment of the present invention, include a full list of dependencies. The list of dependencies can list each table containing records associated with the harvest of interest. In other words, the redaction agent can maintain a listing of the particular pieces of metadata of interest, based, in one embodiment, on record names, that are in a particular group.

As the redaction agent is told to purge records about a given harvest from a particular table, it can remove the table from the list of dependences but does not purge the table. Once the dependencies field associated with that harvest field is empty the redaction agent knows that is has been told to purge all records associated with the harvest of interest. Thus, the redaction agent can determine which pieces of metadata of interest in a particular group (e.g., the harvest1 group) have impacted by the application of a set of heuristics and can purge a group of metadata once all the pieces of metadata in that group have been so impacted.

As an example, assume there are two harvests having the HarvestIDs harvest1 and harvest2 (e.g., two groups of gathered metadata). Each harvest can have several records in the Path Name table and Last Access Time table. The dependencies list maintained by redaction agent 710 can list the Last Access Time table and the Path Name table for each of harvest1 and harvest2. In other words, redaction agent 710 can maintain a representation of the sets of filesystem metadata (e.g., records) that contain the predefined attribute harvest1 or harvest2 by listing the tables that contain records having those attributes. This indirectly indicates the pieces of metadata of interest (i.e., the pieces of metadata to which a heuristic will be applied) to the redaction agent. If summary agent 712 summarizes access times for Harvest1 it can send a list of records from Last Access Time table that correspond to Harvest1 to redaction agent 710. Since the Last Access Time table includes at least one of the pieces of metadata of interest (e.g., "atime"), the redaction agent will know that the "atime" attribute has been impacted by the application of heuristics. Because it has been told which records to purge, redaction agent 710 can remove the Last Access Time table from the dependencies list associated with Harvest1.

Thus, as the sets of metadata corresponding to the predefined attribute harvest1 are processed, redaction agent can remove the representation of those sets of metadata (the table name) from the list of dependencies associated with the predefined attribute Harvest1. However, since the Path Name table remains in the dependencies list for Harvest1, redaction agent 710 will not immediately purge the records corresponding to Harvest1. This is because summary agent 712 has not yet performed a summary that impacted the metadata of interest in the Path Name table. If summary agent 712 then performs a summary that requires records corresponding to Harvest1 from the Path Name table, it can send a list of those records to redaction agent 710. Again, redaction agent 710 can remove the representation of the sets of metadata (e.g., the Path Name table name) from the list of dependencies associated with the Harvest1 attribute as the sets of metadata (e.g., the records) containing the Harvest1 attribute have been processed. Because the list of dependencies associated with the Harvest1 attribute is now empty, redaction engine 710 can purge all the records from the Path Name table and the Last Access Time table that correspond to the attribute Harvest1. However, since the Last Access Time table and Path name table are still listed in the dependencies table for Harvest2, the redaction agent will not purge records relating to Harvest2.

Redaction agent 710 can thus maintain, directly or indirectly, a list of the metadata of interest (i.e., the metadata in a group to be impacted by the application of heuristics) and, when all the metadata of interest in a group has been impacted by the application of a heuristic, can purge the group. It should be understood that synchronous and asynchronous collection and redaction can happen in parallel with each other. Concurrency control is provided by database mechanisms in the usual way. It should be noted that the redaction agent or agents can continuously and iteratively operate on the database in order to maintain a current statistical view of filesystem operations while ensuring that the database remains a manageable size.

As would be understood by one of ordinary skill in the art, the present invention allows the automated transformation and archival of static log data about filesystem activity into dynamically maintained, user definable time series data about filesystem statistics of interest. The present invention provides advantages over prior art systems because, in traditional filesystem logging techniques, the collection and storage of filesystem metadata becomes untenably burdensome because the logs grow quickly and consume a large amount of storage capacity. Embodiments of the present invention, on the other hand, provide the ability to both collect filesystem metadata and dynamically redact or "historize" it to allow ongoing filesystem statistics to be maintained while reducing the required amount of storage capacity.

Figure 8:
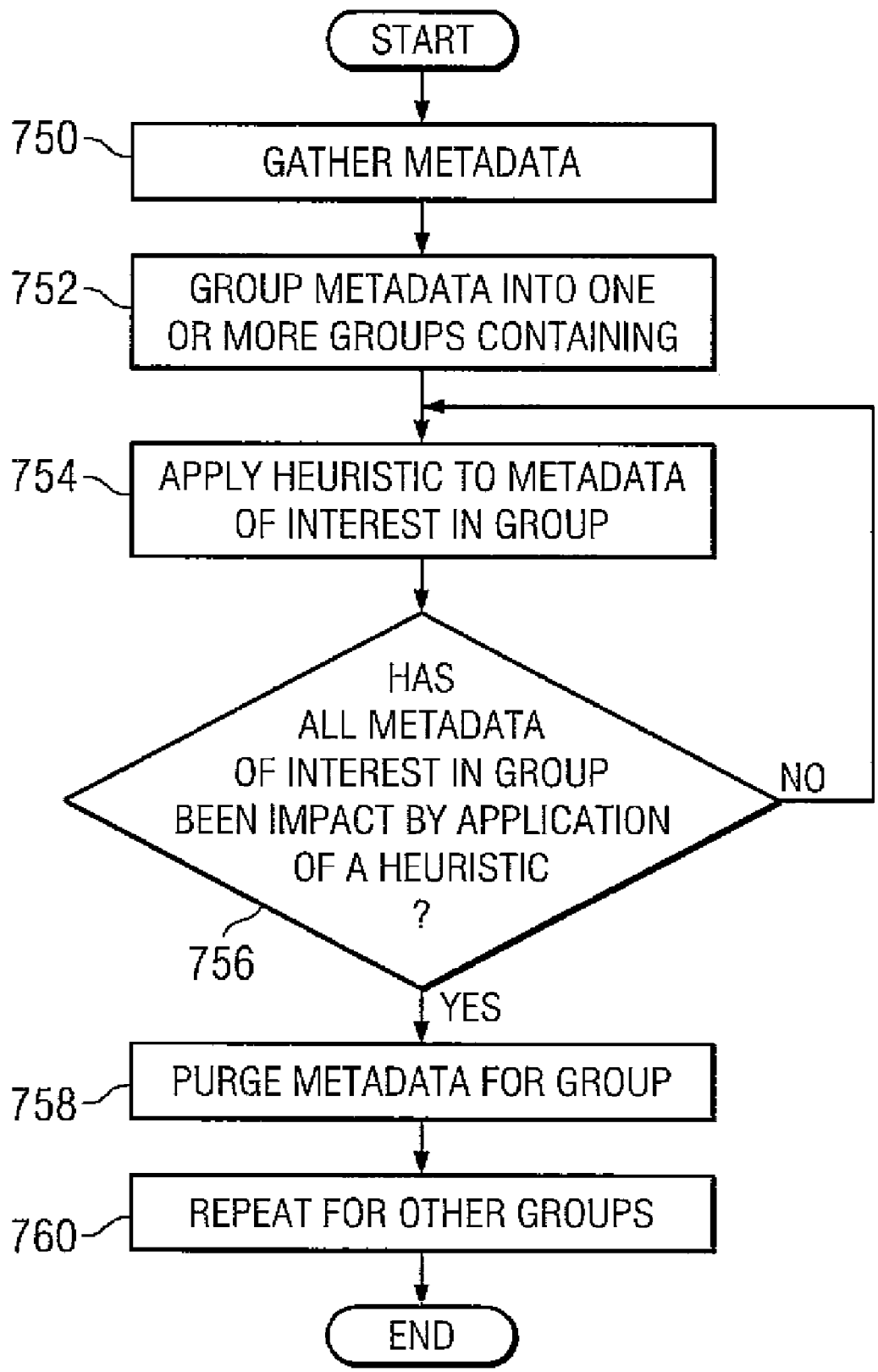
FIG. 8 is a flow chart illustrating one embodiment of a summarizing and redacting metadata in a statistical warehouse.

FIG. 8 is a flow chart illustrating one embodiment of a method of generating a statistic of interest and historizing the statistical warehouse. The methodology of FIG. 8 can be implemented as a set of computer instructions stored on one or more computer readable mediums that are executable by one or more computer processors. At step 750, metadata can be gathered synchronously or asynchronously to the processing of a filesystem operation and can be saved in a statistical warehouse. The statistical warehouse can be database or other suitable data storage format as would be understood by those of ordinary skill in the art. The gathered metadata can include filesystem metadata, metadata generated by the summary agents and/or other metadata. At step 752, the metadata can grouped, based for example, on an attribute associated with the metadata. Using the example of FIG. 7, the metadata can be grouped according to the HarvestID. At step 754, heuristics can be applied to at least a portion of the metadata of interest in a particular group. For example, heuristics can be applied to "atime" metadata of interest for the harvest1 group to generate a set of age buckets (i.e., the statistic of interest).

At step 756, it can be determined if each of the pieces of metadata of interest for a particular group have been impacted by the application of a heuristic (i.e., if all the metadata of interest for a group has been summarized). Again, in the example of FIG. 7, this can be done by passing record names that contain the metadata impacted by a heuristic to a redaction agent. The redaction agent can then compare the records received to the table names in a redaction field. If all the tables have been impacted for a particular group, assuming each record for a table only contains one piece of metadata of interest, then the redaction agent will know that each piece of metadata of interest for a group has been impacted by the application of a heuristic.

If all the pieces of metadata of interest for a group have not been impacted additional heuristics can be applied. For example, if a heuristic is applied to the "atime" metadata of interest to develop age buckets, as described in conjunction with FIG. 7, the redaction agent will know that the "atime" metadata of interest has been impacted by a heuristic by receiving a list of records corresponding to the LastTimeAccessed Table. However, because records corresponding to the PathName Table have not been impacted, the redaction agent will know that some piece of metadata of interest, say the "parentPath," metadata has not been summarized. Control can return to step 754 so that a summary agent can apply additional heuristics to a group.

If, on the other hand, it is determined that all the metadata of interest in a group has been summarized (i.e., impacted by a heuristic) control can pass to step 758 and the metadata for a particular group can be purged from the statistical warehouse. The steps of FIG. 8 can be repeated for each group metadata.

Figure 9:
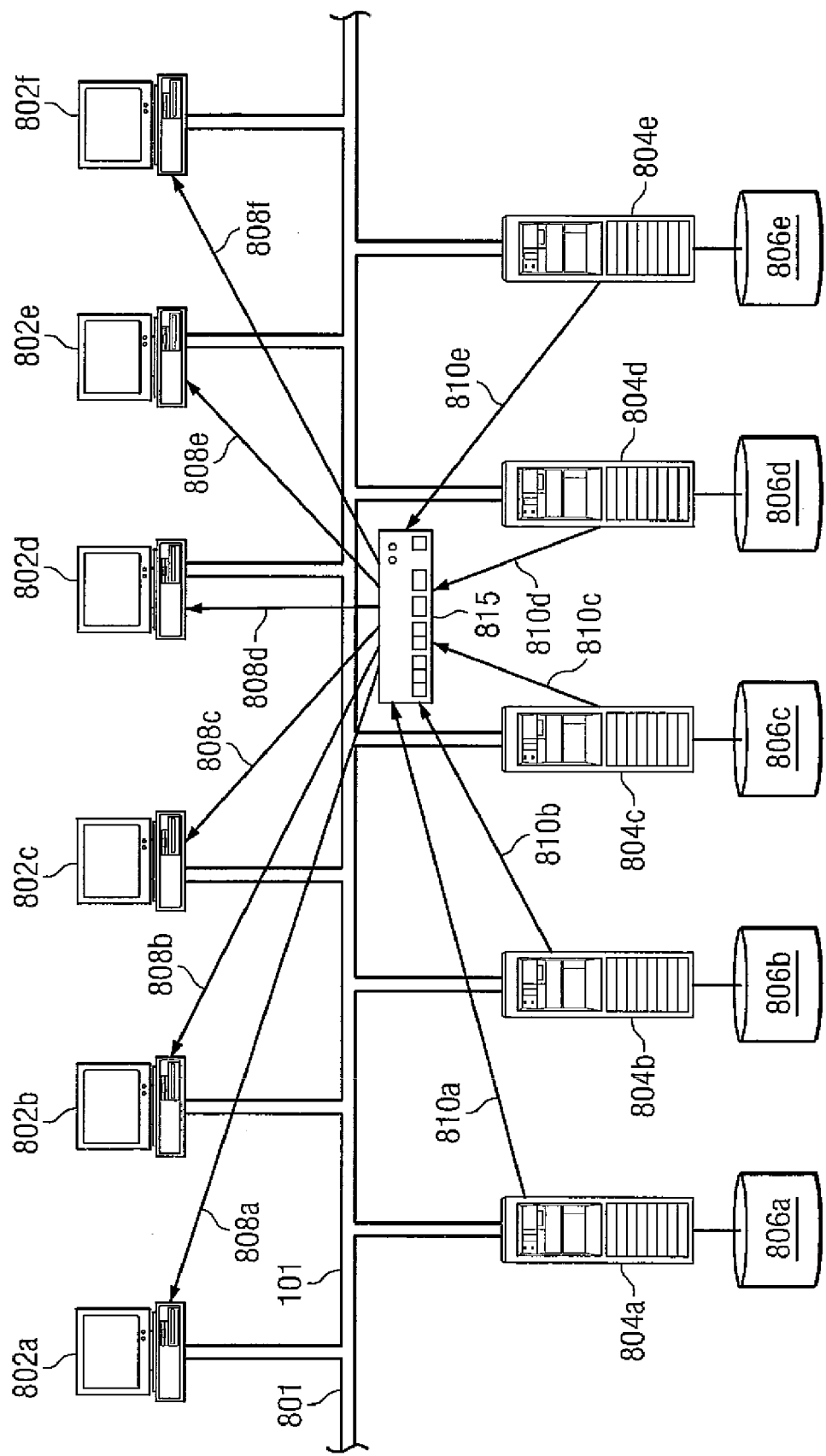
FIG. 9 is a diagrammatic representation of one embodiment an n-tier architecture using, for the sake of example, three tiers.

In the above examples, active rules and a statistical warehouse are applied to a two-tier architecture. However, it should be understood that each can employed in an n-tier architecture having three or more tiers. FIG. 9 is a diagrammatic representation of an n-tier architecture using, for the sake of example, three tiers. A data network 801 (e.g., a LAN, a WAN, the internet, a wireless network or other network known in the art) connects a number of clients 802*a*-802*f* to a number of servers 804*a*-804*e*. The servers 804*a*-804*e* are each connected to one or more storage media devices 806*a*-806*e* (e.g., hard drives, tape drives, disk drives or other storage media device known in the art). Each server can provide a filesystem of the underlying media storage device. In other words, filesystem each server can present a filesystem interface to filesystem clients and implement the appropriate interfaces and integrations necessary to communicate with and manage data storage on an underlying storage medium. Thus, servers 804a-804e act as "origin fileservers" as they directly provide the filesystems for underlying media storage devices 806a-806e. An intermediary device 815 can create an intermediary filesystem that is based on the filesystems presented by servers 804a-804e, and present the intermediary filesystem to clients 802a-802f. Thus, the network file system can be represented by mounts 808a-808f (the mounts between the intermediary filesystem and clients) and 810a-810e (the mounts between servers 808a-808e and intermediary device 815).

Figure 10:
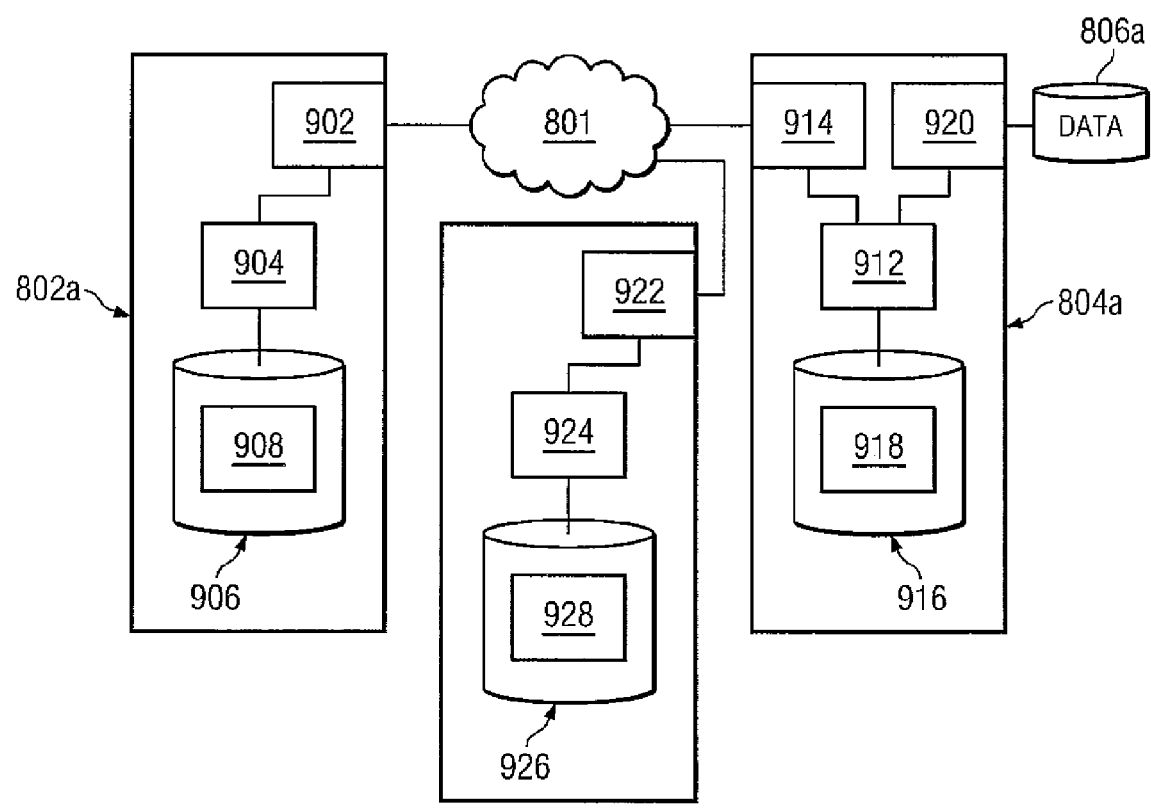
FIG. 10 is a diagrammatic representation of a portion of the n-tier architecture from FIG. 8.

FIG. 10 is a diagrammatic representation of a portion of the n-tier architecture from FIG. 9, including client 802a, intermediary device 815 and server 804a, media storage device 806a and network 801. In one embodiment of the present invention, client 802a can include a processor 902, a communications interface device 904 (internal or external modem, Ethernet interface and/or any other network interface known in the art) coupled to processor 902 to connect to and interface with network 801, an a computer readable storage medium 906 (e.g., RAM, ROM, optical disk, magnetic storage medium and/or any other computer readable storage medium) coupled to processor 902 storing a set of computer readable instructions 908 ("client program 208") executable by processor 902. Client 802a can include other computer components known in the art.

Similarly, server 804a can include a processor 912, a network interface device 914 coupled to processor 912 to connect to and interface with network 801, and a computer readable storage medium 916 (e.g., RAM, ROM, optical disk, magnetic storage medium and/or any other computer readable storage medium) coupled to processor 912 storing a set of computer readable instructions 918 ("server program 918") executable by processor 912. Server 804a can also be coupled to an attached storage media device 806a via a second communications interface 920 (e.g., Ethernet connection, internal or external modem or other interface known in the art) and can maintain a filesystem for storage media device 806a.

Figure 24:
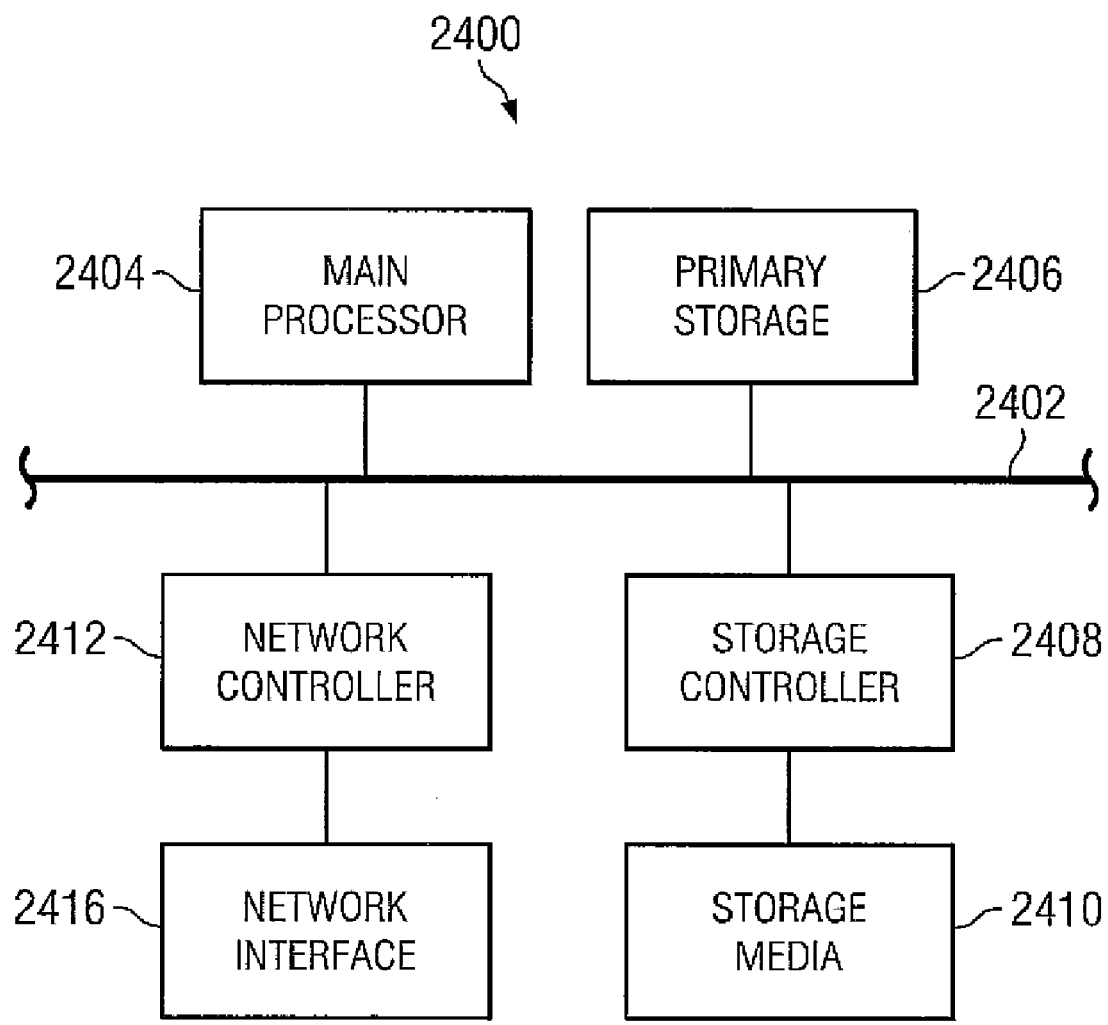
FIG. 24 illustrates another embodiment of an intermediary device.

Intermediate device 815 can similarly include a processor 922, a communications interface device 924 (internal or external modem, Ethernet interface and/or any other network interface known in the art) coupled to processor 922 to connect to and interface with network 801, an a computer readable storage medium 926 (e.g., RAM, ROM, optical disk, magnetic storage medium and/or any other computer readable storage medium) coupled to processor 922 storing a set of computer readable instructions 928 ("intermediary program 928") executable by processor 922. Intermediary device 815 can include other computer components known in the art. Another embodiment of intermediary device 815 is illustrated in FIG. 24.

Figure 11:
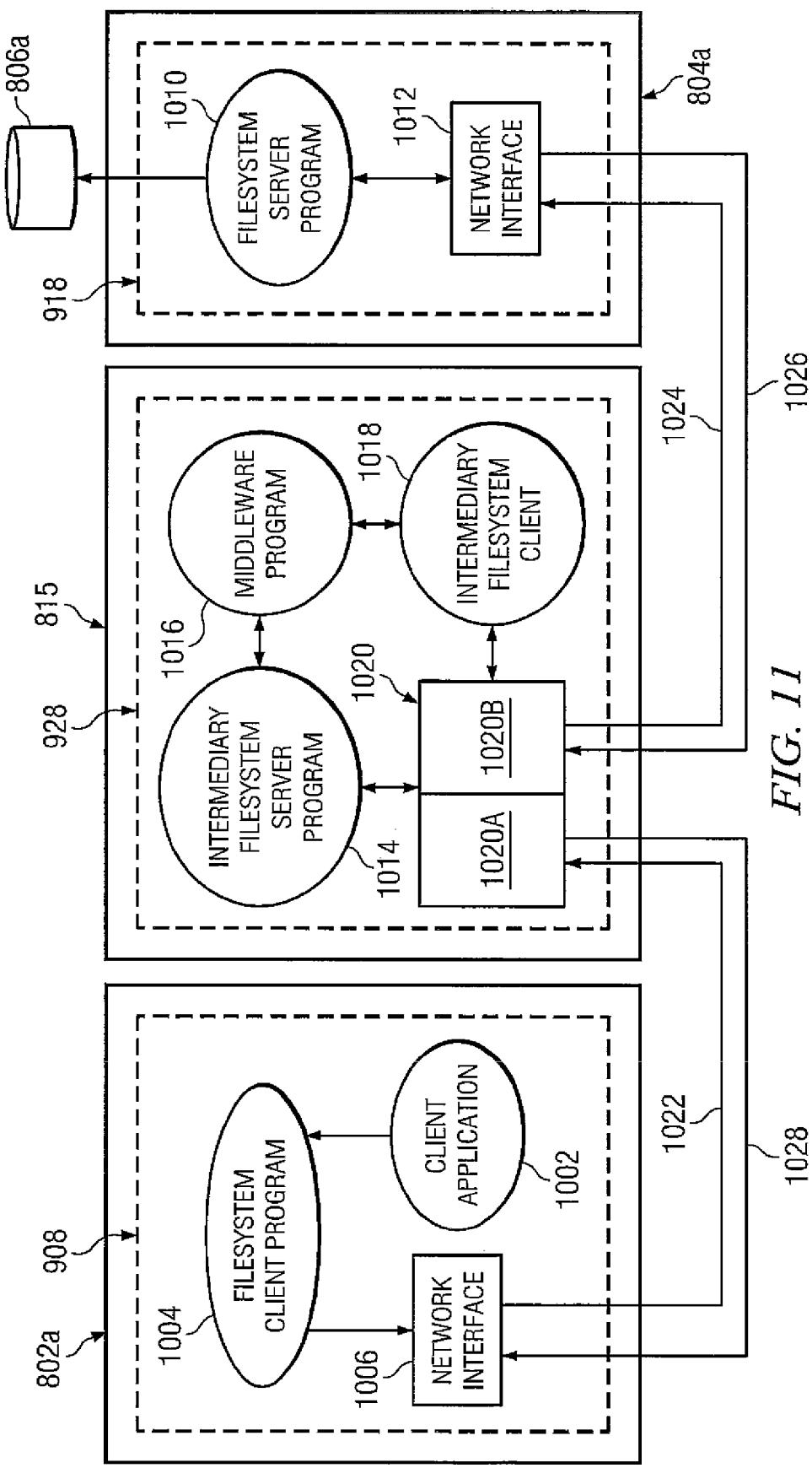
FIG. 11 is a diagrammatic representation of one embodiment of the interactions in an n-tier filesystem architecture according to the embodiment of FIG. 9.

FIG. 11 is a diagrammatic representation of one embodiment of the interactions in an n-tier filesystem architecture according to the embodiment of FIG. 10. FIG. 11 illustrates the interactions between client 802a, intermediary device 815, server 804a and media storage device 806a. Client program 908 at client 802a can, in one embodiment of the present invention, include a client application program 1002, a filesystem client program 1004 and a network interface program 1006. Although shown as subprograms of an overarching client program 908 in FIG. 11, filesystem client program 1004, client application program 1002 and network interface program 1006 can be implemented as separate programs, modules of the same program or in any other suitable programming manner, as would be understood by those of ordinary skill in the art.

Server program 918 at server 804a can include a filesystem management program 1010 and a network interface program 1012. Filesystem management program 1010 can provide the filesystem for storage media device 806a. In other words, filesystem manager 1010 can implement a filesystem for the associated media storage device to represented the block level storage on storage media device 806a. Filesystem management program 1010 and network interface program 1012 can be implemented as a single program, modules of the same program, separate programs or in any other suitable programming manner, as would be understood by those of ordinary skill in the art.

Intermediary program 928 at intermediary device 815 can include an intermediary filesystem server program 1014, a middleware program 1016, an intermediary filesystem client program 1018 and a network interface 1020. It should be noted that intermediary program 928 can include a client facing interface 1020A and a server facing interface 1020B. Client facing interface 1020A can include any filesystem protocol implementation known in the art including CIFS and/or NFS. Server facing interface 1020B can also comprise any filesystem protocol implementation known in the art. To clients, such as client 802a, intermediary device 815 appears as a server and to servers, such as server 804a, intermediary device 815 appears as a client. It should be noted that server facing interface 1020B can employ a different network filesystem protocol than client-facing interface 1020A. In such a case, intermediary program 928 can perform arbitrary protocol translation and bridging between the different network filesystem protocols. While shown separately in FIG. 11, each of intermediary filesystem server program 1014, middleware program 1016, intermediary filesystem client program 1018 and network interface 1020 can be implemented as a single program, modules of a program, separate programs or in any other suitable program structure. It should be noted that, while client program 908, intermediary program 928 and server program 908 are shown as being remotely located from each other, client program 908 and/or intermediary program 928 and/or server program 908 can be local to each other. Thus, for example, intermediary program 928 can communicate with a remote or local client program 908.

In operation, intermediary filesystem server program 1014 can present a union filesystem or virtual filesystem that represents the filesystems presented by underlying filesystem server programs (e.g., filesystem server program 1010). When client application 1002 wishes to access a file or directory that it "sees" on the union filesystem, client application 1002 can generate a request. The application's request can be intercepted by filesystem client program 1004, which can generate an original filesystem request. The original filesystem request, represented by line 1022, is directed to intermediary device 815.

Intermediary device 815, via client facing interface 1020A receives the request and forwards the request to intermediary filesystem server program 1014, which can refer the request to middleware program 1016. Middleware program 1016 can take a variety of actions in response to the original request including determining which server should receive a request and passing the request modified or unmodified to intermediary filesystem client 1018. Intermediary filesystem client 1018 can then generate a proxy request, represented by line 1024, and direct it to the appropriate server (e.g., server 804a) via server facing interface 1020B. The proxy request can be the same as the original request or be arbitrarily modified from the original request. In one embodiment of the present invention, intermediary program 928 can arbitrarily delay generating the proxy request.

At server 804a, filesystem server program 1010 can take the appropriate action based on the request, such as reading or writing to media storage device 106a and send an original response, represented by line 1026, to intermediary device 815. At intermediary device 815, network interface 1020 can receive the original response and pass the response to intermediary filesystem client, which can, in turn, pass the original response to middleware program 1016. The original response can be modified or unmodified at middleware program 1016 and passed to intermediary filesystem server program 1014, which can, in turn, generate a proxy response. Filesystem server program 1014 can send the proxy response, represented by line 1028, to filesystem client program 1004. The proxy response can then be forwarded to client application 1002. In one embodiment of the present invention, intermediary program 928 can also arbitrarily delay sending the proxy response to filesystem client program 1004.

FIGS. 9-11 illustrate embodiments of a three-tier architecture. It should be noted, however, that the server facing interface of an intermediary program may interface with the client-facing interface of another intermediary program, and so on, to constitute an arbitrary number of tiers in the overall architecture of the network filesystem. This arrangement of having one or more intermediaries between filesystem clients and the origin filesystem servers decouples the filesystem clients from the servers and insulates them from changes that occur to the structure and organization of the origin filesystem. This can occur because the one or more intermediaries presents a virtual filesystem to the clients that represents the clients views of the underlying filesystems. As the filesystems at the origin fileservers change, the virtual filesystem can simply re-map the virtual filesystem to the modified origin filesystems transparently to the clients. An origin filesystem may be partially or completely moved between fileservers without affecting any change to the client's view of the filesystem and without any interruption of service. This provides a degree of flexibility in the organization and utilization of network filesystems that is not possible in conventional 2-tier or client-server network filesystems.

Traditional filesystem implementations discourage decoupling clients from servers due to concerns about preserving expected filesystem semantics. Intermediary program 928 can, in one embodiment of the present invention, maintain the expected semantics at all times. This can be done, for example, by disallowing or modifying operations which might result in an inconsistent or unexpected state. As would be understood by one of ordinary skill in the art, this can be accomplished through defining all operations implemented by the client-facing interface in terms of the operations provided by the server facing interface.

Figure 12:
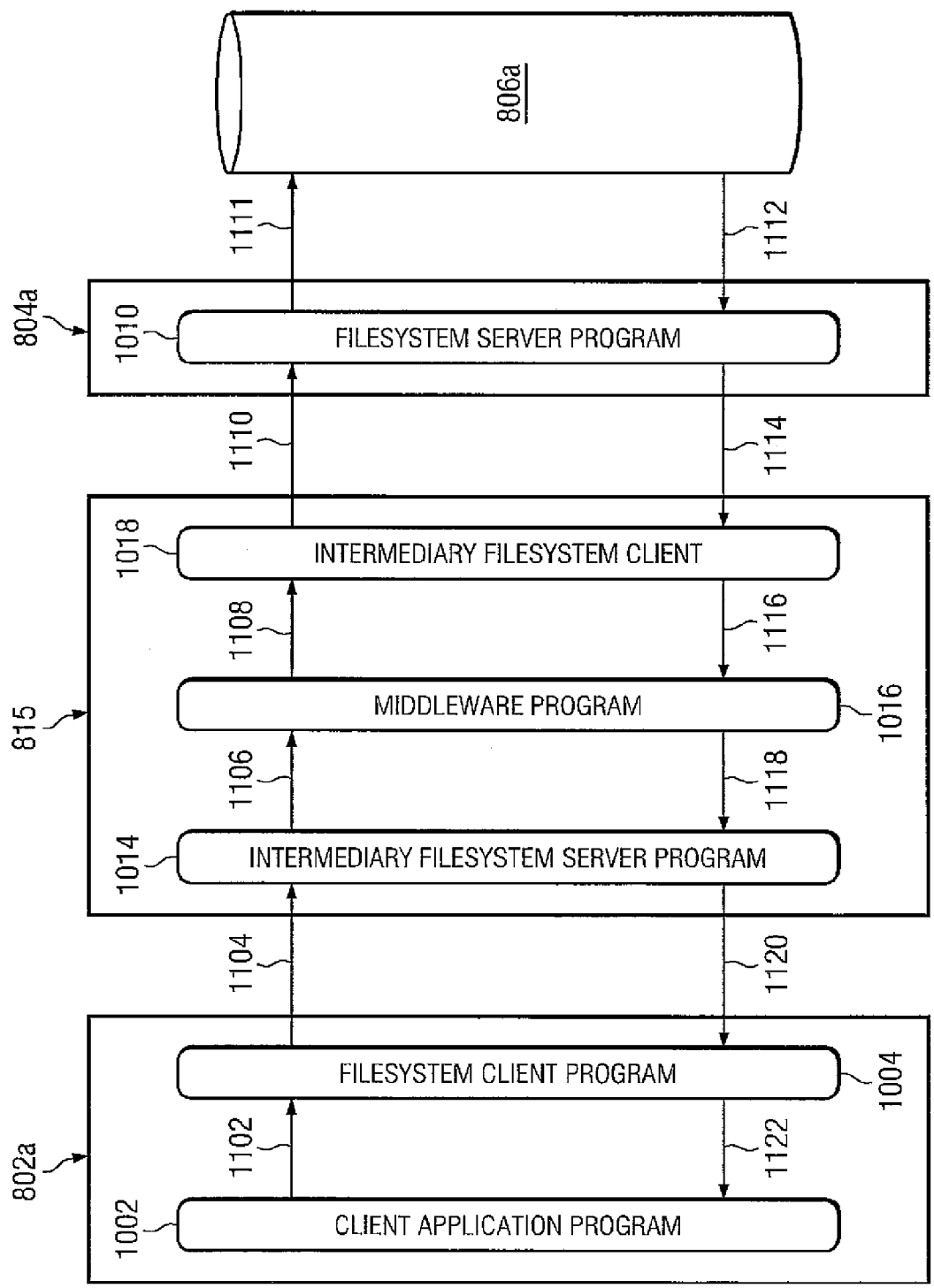
FIG. 12 is a sequence diagram depicting the interactions discussed in conjunction with FIG. 10 for one embodiment an n-tier architecture.

FIG. 12 is a sequence diagram depicting the interactions discussed in conjunction with FIG. 11 for an n-tier architecture. In the case the n-tier architecture is a three-tier architecture and includes client computer 802a, middleware computer 815, and server computer 804a communicating over a network 801. For the sake of simplicity, the network interface portions from FIG. 11 have been omitted. Client application 1002 can make a request 1102 of filesystem client 1004. The filesystem client program 1004 generates request 1104 to filesystem server program 1014 on intermediary device 815. This request is subsequently passed as 1106 to middleware program 1016. The middleware program may subsequently make a request 1108 of filesystem client 1018. This request results in a request 1110 being issued to filesystem server 1010 residing on server computer 804a. The filesystem server may then act on its storage medium or resource 806a (e.g., by performing operation 1111), receiving an appropriate response 1112 according to its program.

Filesystem server 1010 on server computer 804a then responds to request 1110 by issuing response 1114 to filesystem client 1018 on intermediary device 815. The client program 1018 responds to request 1108 by response 1116, causing middleware program 1016 to respond to its request 1106 with response 1118. This response 1118 may be arbitrarily unlike or like the response from the actual server, according to the program of the middleware program 1016. One skilled in the art will appreciate that this allows the middleware program to implement arbitrary policies, data transformations, and other operations, effectively modifying the view and behavior of the filesystem server as seen by the client. The middleware program 1016 responds to its request 1106 with response 1118; the filesystem server 1014 the responds to its request 1104 by issuing response 1120 to the filesystem client 1004 residing on client computer 802a. Finally, the client program 1004 responds to the original request 1102 by issuing response 1122 to client application 1002. Thus the transaction is completed in a n-tier network filesystem architecture, where in this example n=3.

Figure 13:
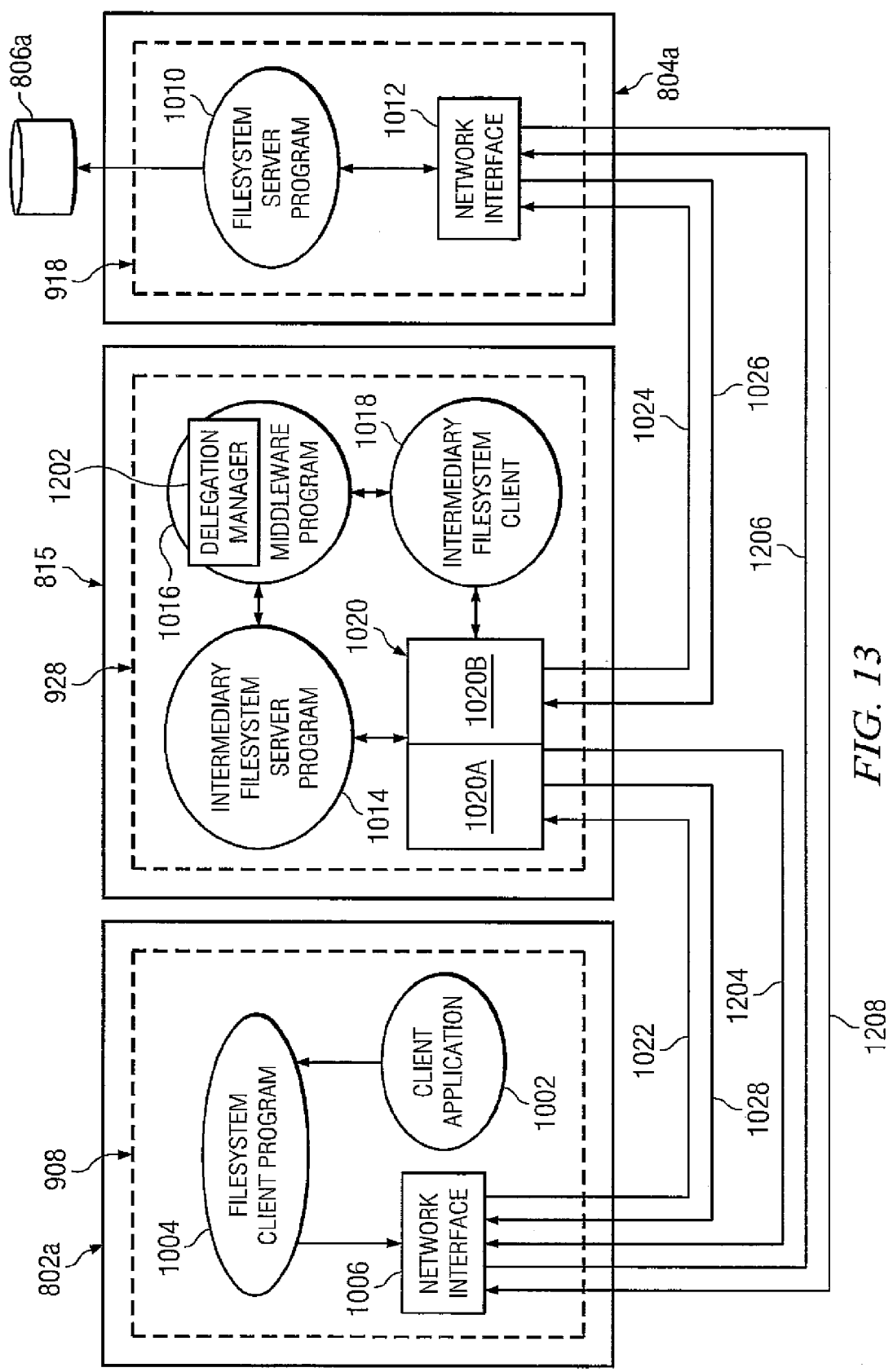
FIG. 13 is a diagrammatic representation of one embodiment of the interactions in an n-tier filesystem that can employ selective delegation.

In another embodiment of the present invention, intermediate program 928 can delegate some of the request/response transactions to an underlying origin fileserver. FIG. 13 is a diagrammatic representation of one embodiment of the interactions in an n-tier filesystem that can employ selective delegation. FIG. 13 illustrates the interactions between client 802a, intermediary device 815, server 804a and media storage device 806a. Client program 908 at client 802a can, in one embodiment of the present invention, include a client application program 1002, a filesystem client program 1004 and a network interface program 1006. Although shown as subprograms of an overarching client program 908 in FIG. 11, filesystem client program 1004, client application program 1002 and network interface program 1006 can be implemented as separate programs, modules of the same program or in any other suitable programming manner, as would be understood by those of ordinary skill in the art.

Server program 918 at server 804a can include a filesystem management program 1010 and a network interface program 1012. Filesystem management program 1010 can provide the filesystem for storage media device 806a. In other words, filesystem manager 1010 can implement a filesystem for the associated media storage device to represented the block level storage on storage media device 806a. Filesystem management program 1010 and network interface program 1012 can be implemented as a single program, modules of the same program, separate programs or in any other suitable programming manner, as would be understood by those of ordinary skill in the art.

Intermediary program 928 at intermediary device 815 can include an intermediary filesystem server program 1014, a middleware program 1016, an intermediary filesystem client program 1018 and a network interface 1020. It should be noted that intermediary program 928 can include a client facing interface 1020A and a server facing interface 1020B. Client facing interface 1020A can include any filesystem protocol implementation known in the art including CIFS and/or NFS. Server facing interface 1020B can also comprise any filesystem protocol implementation known in the art. To clients, such as client 802a, intermediary device 815 appears as a server and to servers, such as server 804a, intermediary device 815 appears as a client. It should be noted that server facing interface 1020B can employ a different network filesystem protocol than client-facing interface 1020A. In such a case, intermediary program 928 can perform arbitrary protocol translation and bridging between the different network filesystem protocols. In addition, intermediary program 928 can include a delegation manager 1202.

While shown separately in FIG. 13, each of intermediary filesystem server program 1014, middleware program 1016, intermediary filesystem client program 1018 and network interface 1020 can be implemented as a single program, modules of a program, separate programs or in any other suitable program structure. It should be noted that, while client program 908, intermediary program 928 and server program 908 are shown as being remotely located from each other, client program 908 and/or intermediary program 928 and/or server program 908 can be local to each other. Thus, for example, intermediary program 928 can communicate with a remote or local client program 908.

In operation, intermediary filesystem server program 1014 can present a union filesystem or virtual filesystem that represents the filesystems presented by underlying filesystem server programs (e.g., filesystem server program 1010). When client application 1002 wishes to access a file or directory that it "sees" on the union filesystem, client application 1002 can generate a request. The application's request can be intercepted by filesystem client program 1004, which can generate an original filesystem request. The original filesystem request, represented by line 1022, is directed to intermediary device 815.

Intermediary device 815, via client facing interface 1020A receives the request and forwards the request to intermediary filesystem server program 1014. Delegation manger 1202 can determine whether to delegate or service any given request based on any arbitrarily defined criteria. If delegation manger 1202 determines that a request should be serviced, middleware program 1016 can take a variety of actions in response to the original request including determining which server should receive a request and passing the request modified or unmodified to intermediary filesystem client 1018. Intermediary filesystem client 1018 can then generate a proxy request, represented by line 1024, and direct it to the appropriate server (e.g., server 804a) via server facing interface 1020B. The proxy request can be the same as the original request or be arbitrarily modified from the original request. In one embodiment of the present invention, intermediary program 928 can arbitrarily delay generating the proxy request.

At server 804a, filesystem server program 1010 can take the appropriate action based on the request, such as reading or writing to media storage device 106a and send an original response, represented by line 1026, to intermediary device 815. At intermediary device 815, network interface 1020 can receive the original response and pass the response to intermediary filesystem client, which can, in turn, pass the original response to middleware program 1016. The original response can be modified or unmodified at middleware program 1016 and passed to intermediary filesystem server program 1014, which can, in turn, generate a proxy response. Filesystem server program 1014 can send the proxy response, represented by line 1028, to filesystem client program 1004. The proxy response can then be forwarded to client application 1002. In one embodiment of the present invention, intermediary program 928 can also arbitrarily delay sending the proxy response to filesystem client program 1004.

If delegation manager 1202 determines that an operation is to be redirected, it can generate a redirect reply (represented by line 1204) informing client program 928 to contact fileserver 804a directly. Based on the redirect reply, fileserver client program 1004 can generate a new request to fileserver program 1010 (represented by line 1206). Filesystem management program 1010 can then perform the requested operation and, upon completion construct response 1208 and direct it back to client program 908. Filesystem client program 1004 can forward the response to waiting client application program 1002, thus completing the transaction.

Figure 14:
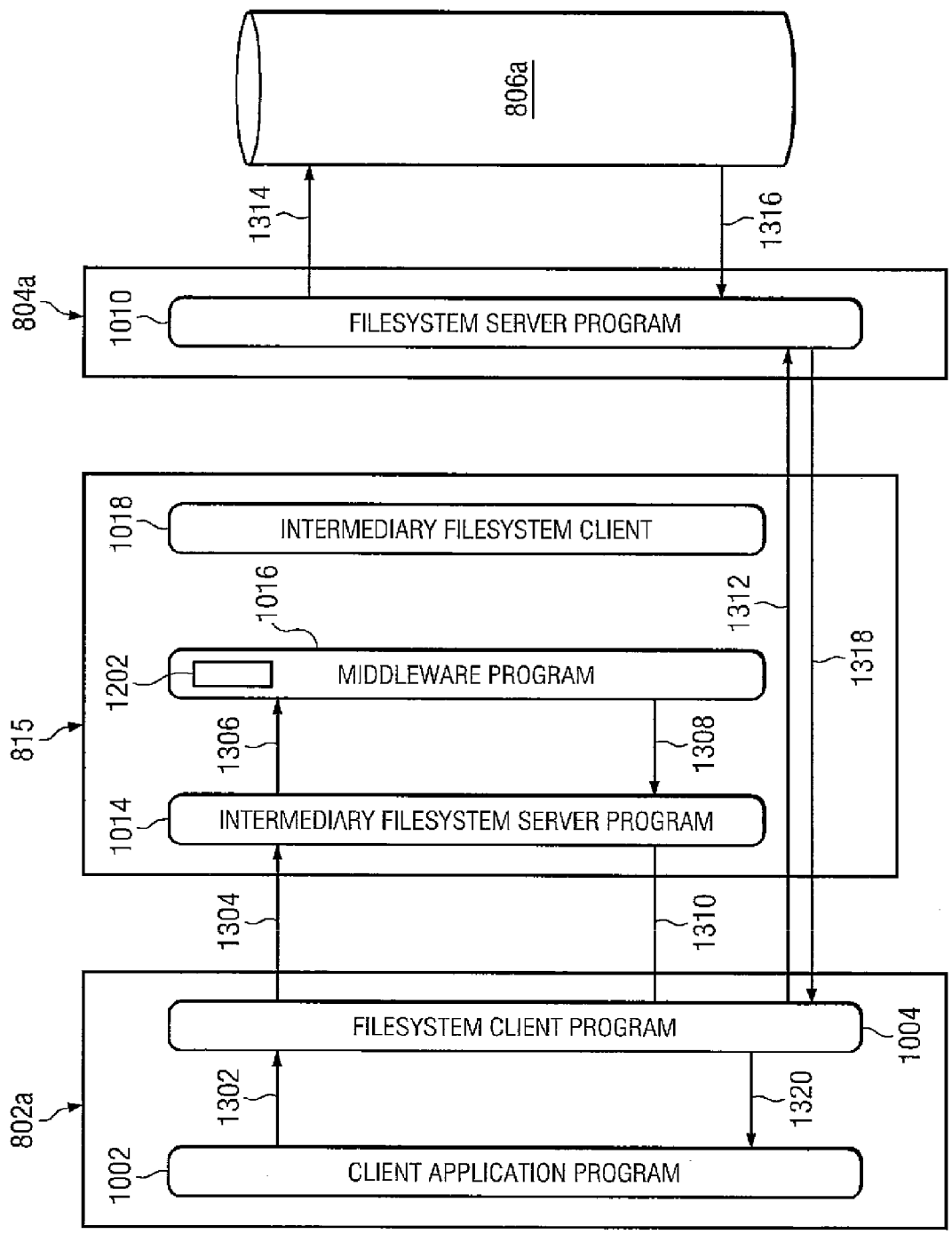
FIG. 14 is a sequence diagram depicting one embodiment the interactions discussed in conjunction with FIG. 12 for an n-tier architecture in which redirect occurs.

FIG. 14 is a sequence diagram depicting the interactions discussed in conjunction with FIG. 13 for an n-tier architecture in which redirect occurs. In this case the n-tier architecture is a three-tier architecture and includes client computer 802a, middleware computer 815, and server computer 804a communicating over a network 801. For the sake of simplicity, the network interface portions from FIG. 13 have been omitted. Client application 1002 can make a request 1302 of filesystem client 1004. The filesystem client program 1004 generates request 1304 to filesystem server program 1014 on intermediary device 815. This request is subsequently passed as 1306 to middleware program 1016. Delegation Manger 1202 at middleware program 1016 may decide to direct the client to contact the server directly to service this request. This is termed a "redirection" or "delegation." It should be noted that delegation manger 1202 may use arbitrary heuristics to determine whether or not to delegate the request or it may instead determine that the request should be processed at intermediary device 815, in which case the interaction can proceed as described in conjunction with FIG. 12. In the case of a redirection, middleware program 1016 responds to request 1306 by issuing a redirect response 1308 to intermediary filesystem server program 1014, which in turn responds to its request 1304 by issuing redirect response 1310 to filesystem client program 1004. Filesystem client program 1004 can be configured to recognize this redirect request and, based on data contained in the request, reissue the request 1304 as 1312, modified appropriately e.g. with the receiver of the request changed from middleware computer 815 to server computer 804a. Request 1312 can be read by filesystem server program 1010 residing on server computer 804a, which subsequently issues a request 1314 to its storage resource 806a, as appropriate. The response 1316 to request 1314 is marshaled into a response 1318 which is made to filesystem client program 1004. Finally, filesystem client program 1004 responds to the original request 1302 by issuing response 1320 to client application 1002. Thus the transaction is completed in a n-tier network filesystem architecture, wherein this example n=3, by means of delegation of the request by intermediary device's 815 subsystems to the filesystem server program 101 residing on server 804a.

Figure 15:
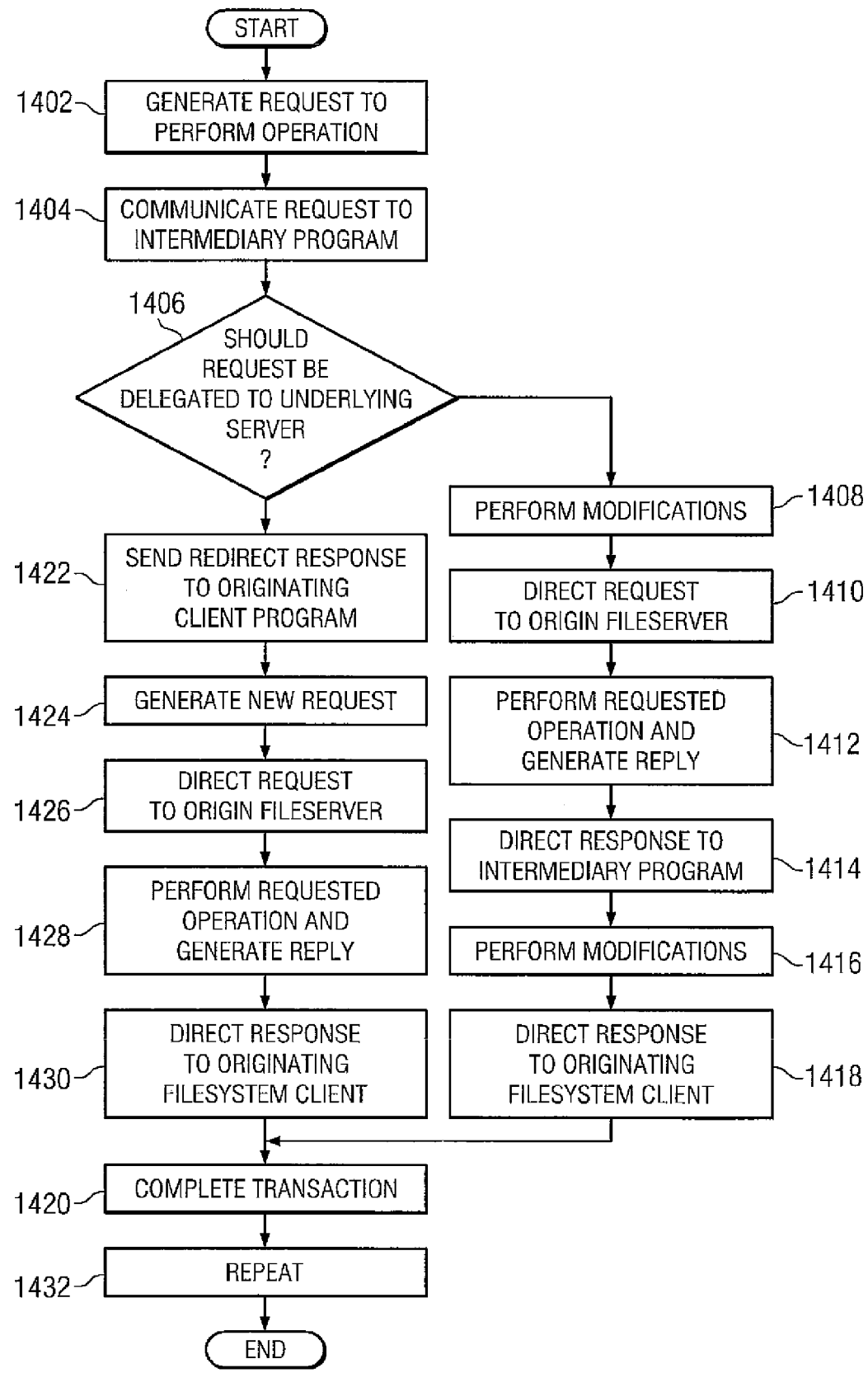
FIG. 15 is a flow chart illustrating one method for managing filesystem requests according to one embodiment of the present invention.

FIG. 15 is a flow chart illustrating one method for managing filesystem requests according to one embodiment of the present invention. It should be noted that the method of FIG. 15 can be implemented as one or more sets of computer instructions stored on one or more computer readable mediums, executable by one or more processors. In one embodiment of the present invention, a client program can generate a request to perform and operation on data (step 1402) and communicate the request to an intermediary program (step 1404). The intermediary program can determine whether a request should be delegated (i.e., redirected) or serviced by the intermediary program (step 1406). If it is determined, at step 1406, that the request should be served by the intermediary program, control can pass to step 1408. Otherwise, control can pass to step 1422.

At step 1408, the intermediary program and perform any arbitrary modifications to the request and, at step 1410, direct the request (modified or unmodified) to the origin fileserver (or other intermediary program). The origin fileserver, at step 1412 can perform the requested operation and direct the response back to the intermediary program (step 1414). The intermediary program can perform arbitrary modifications (step 1416) and direct the response (modified or unmodified) to the requesting client (step 1418). At step 1420, the transaction can be completed.

If, at step 1406, the intermediary program determined, on the other hand, that the received request should be delegated or redirected, the intermediary program can send a reply to the originating client program directing the originating client program to send a new request directly to the origin fileserver or other intermediary program. The client program can then generate a communicate a new request to the origin fileserver or other intermediary program (steps 1424 and 1426). At step 1428, the origin fileserver can perform the requested operation and return a response to the requesting client program (step 1430). The transaction can be completed at 1420. At step 1432 the process of FIG. 15 can be repeated. It should be noted that the sequence of steps may be altered, depending on implementation, and various steps can be omitted.

As noted in conjunction with FIG. 11, the intermediary program can present a union or virtual filesystem to clients that represents the underlying filesystems at origin fileservers or filesystems presented by other intermediary programs. In one embodiment of the present invention the intermediary program can include a mount manger (e.g., as part of an intermediary fileserver). The mount manger can define an "import space" consisting of one or more origin filesystems and an "export space" that can be made available to clients via, for example, a client-facing interface. The mount manager can define the export space based on ordering and transformational operations on the import space. The export space may be arranged in a traditional 2-dimensional filesystem hierarchy or graph or a 3-dimensional stacking metaphor to logically join multiple filesystems and directory trees into a single, logical entity as seen by filesystem clients. This can allow the filesystem clients to be decoupled from the origin filesystems that make up the import space and can allow the evolution and change in organization and topology of underlying fileservers to occur without changes to the filesystem clients. In other words, the intermediary program can present the filesystem clients with the same intermediary filesystem namespace regardless of changes to the underlying origin filesystems.

Figure 16:
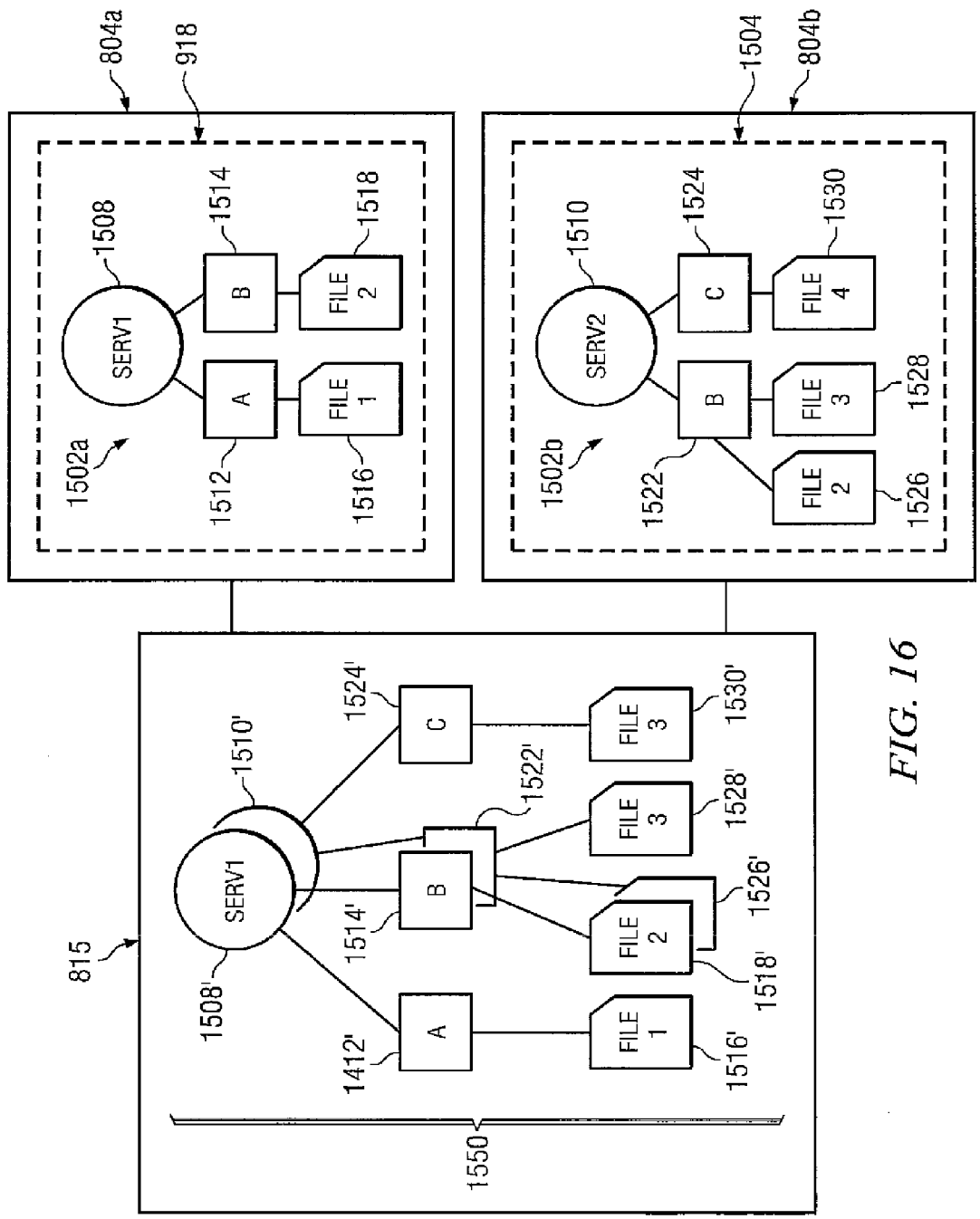
FIG. 16 illustrates one embodiment of organizing one or more filesystems from one or more origin fileservers.

FIG. 16 illustrates one embodiment of organizing one or more filesystems from one or more origin fileservers. One or more filesystems (e.g., filesystems 1502*a* and 1502*b*) maintained by one or filesystem server programs (e.g., filesystem server programs 918 and 1504) at one or more fileservers (e.g., fileservers 804*a* and 804*b*) can be made available to intermediary program 928 at intermediary device 815. In the example of FIG. 16, two "volumes" or independent filesystem directory trees srv1 (1508) and srv2 (1510). The volume srv1 contains two directories named A (1512) and B (1514). Directory Srv1/A (1512) contains a file called "File1" (1516), while directory Srv1/B (1514) contains file "file2" (1518). The volume srv2 contains two directories called B (1522) and C (1524). Directory srv2/B (1522) contains files "file2" (1526) and "file3" (1528). Directory srv2/C (1524) contains file "file4" (1530). Note that directory srv2/B (1522) is independent from directory srv1/B.

In one embodiment of the present invention, volumes 1508 and 1510 can be provided to intermediary program 928 according to any procedure known in the art, including mounting. According to one embodiment, intermediary program can organize the volumes into stacks (referred to as "stack mounting"), such as stack 1550. In stack mounting, the volume on top of the stack will trump volumes lower on the stack to the extent they overlap. To further explain, assume that intermediary program 928 selects srv1 as the top of the stack. It should be noted that for purposes of this discussion the "'" notation indicates the intermediary program's view of the corresponding item in the stack organization. The basic structure for the export space can be defined by intermediary program 928 as shown in FIG. 16. In this case srv1 1508' is a volume having directories A (1512'), B (1514') and C (1524'). Thus srv1 1508' represents srv1 1508 in the stack. Directory B (1522') will not be seen as both volume srv1 and srv2 include a directory B. In other words, the directory B of srv1 hides or obscures the directory B of srv2 because srv1 is on top. However, directory C (1524') will be seen, as only volume srv2 contains a directory C. Similarly, with the files, file1 (1516'), file2 (1518'), file3 (1528') and file4 (1530') can be included in the export space, but file2 (1526') can remain hidden as there is both a /B/file2 (e.g., file2 1518') at srv1 and a /B/file2 (e.g., file 2 1526') at srv2. It should be noted that the term "stack mounted", for purposes of this application, can include stack organizing both mounted filesystems and filesystems that are provided by other mechanisms than mounting.

Figure 17:
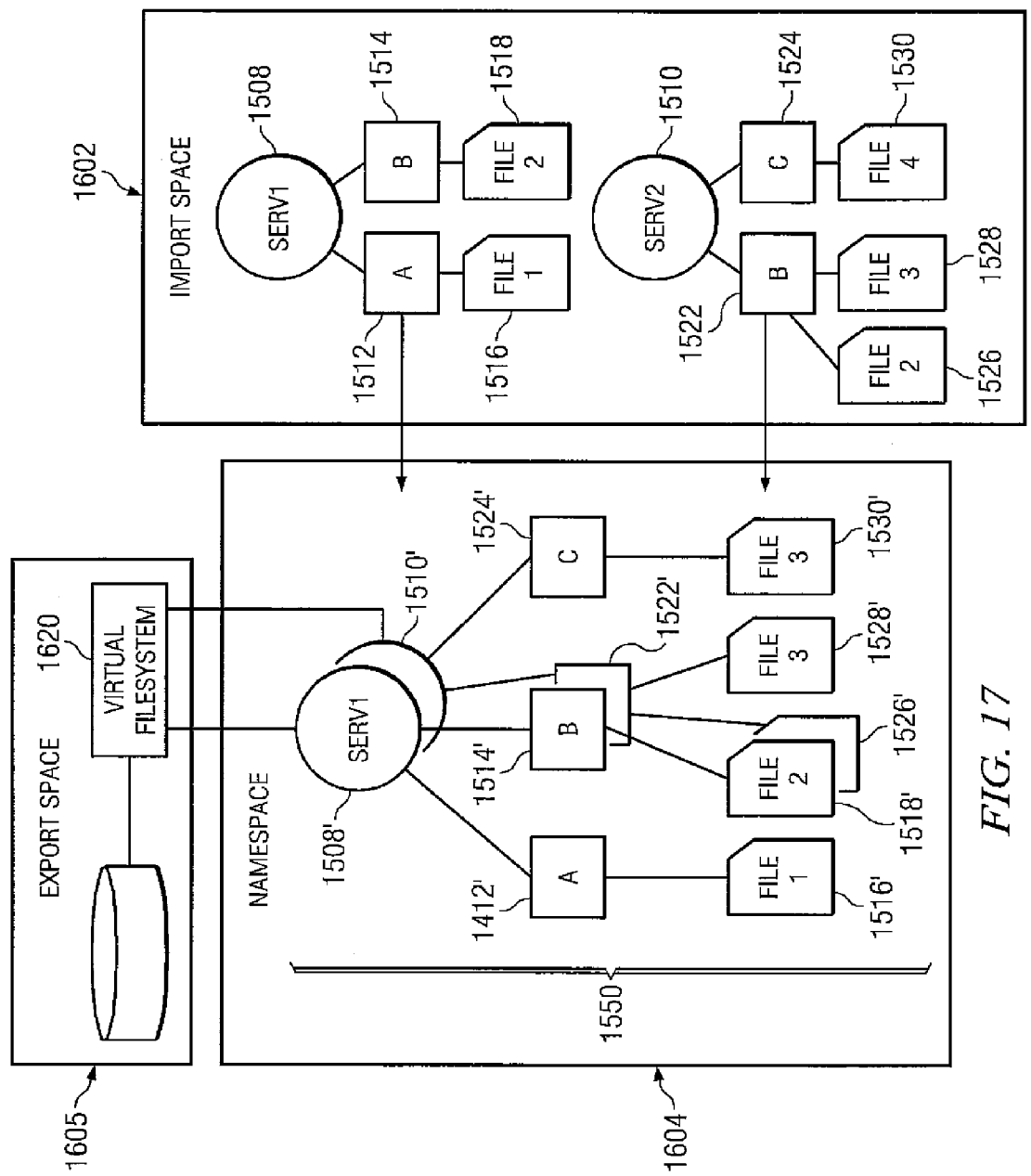
FIG. 17 is a diagrammatic representation of defining an export space at an intermediary program according to the example of FIG. 16.

FIG. 17 is a diagrammatic representation of defining an export space at an intermediary program according to the example of FIG. 16. According to one embodiment, creation of a union or virtual filesystem can be accommodated through three abstractions, the import space 1602, the mapspace 1604 an export space 1605. Import space 1602 can consist of the filesystem volumes srv1 1508 and srv2 1510, which can provided to an intermediary program through any method known in the art (e.g., through mounting). In one embodiment of the present invention, volumes srv1 1508 and srv2 1510 can be brought into the import namespace such that they may be accessed as "/imports/srv1" and imports "/imports/srv2." Similarly, the underlying directories (directory A 1512, directory B 1514, directory B 1522, directory C 1524, file1 1516, file2 1518, file2 1526, file3 1528 and file4 1530) and files can be accessed as "/imports/srv1/A", "/imports/srv1/B", "/imports/srv1/A/file1", "/imports/srv1/B/file2", "/imports/srv2/B", "/imports/srv2/C", "/imports/srv2/B/file2", "/imports/srv2/B/file3", and "'/imports/srv2/C/file 4". In other embodiments of the present invention any organizational convention known in the art can be used to organize import space The volumes can be arbitrarily organized in the mapspace. In one embodiment of the present invention, the volumes can be organized in "stacks" as described in conjunction with FIG. 16. Using the example of FIG. 16, srv1 1508 can become the top layer in the stack 1550. In export space, the export filesystem (e.g., the union or virtual filesystem) 1620 can be accessed at /exports or according to other organizational conventions known in the art. An example virtual filesystem can present "/exports/srv1/", "/exports/srv1/A", "/exports/srv1/B", "/exports/srv1/C", "/exports/srv1/A/file1", "/exports/srv1/A/file2", "/exports/srv1/B/file3", and "'/exports/srv1/C/file4". Each file and directory can appear under srv1 because srv1 is the top of stack 1550. Virtual filesystem 1620 can be the filesystem presented to client programs by the intermediary program. In one embodiment of the present invention, virtual filesystem 1620 can be tied to an active rules set 1622, and active rules can be applied to requests made according to virtual filesystem 1620 as described in conjunction with FIGS. 4-6.

In one embodiment of the present invention the intermediary program makes the filesystem(s) rooted at "/exports" available to clients while using the stacked filesystem 1550 to dispatch file operation onto the appropriate fileservers and origin filesystems by way of the import space paths "/import/srv1/" and "/import/srv2/". As an example, if a client makes a request to perform an operation on "/export/srv1/C/file4", the intermediary program can use stack 1550 to map that request to /import/srv2/C/file4". As another example, if a client makes a request to perform an operation on "/export/srv1/B/file2", the intermediary program can map the request to "import/srv1/B/file2". It should be noted, in one embodiment of the present invention, the command will not be mapped to "import/srv2/B/file2" because srv1, which also contains "/B/file2" is higher in the stack. It should be further noted that multiple export filesystems can be defined with different export filesystems being presented to different clients. In this manner, access control can be implemented at the intermediary device.

As would be understood by one of ordinary skill in the art, embodiments of the present invention provide the ability to flexibly organize and reorganize the virtual filesystem as viewed by clients without impacting the client or the underlying servers. An export space can be arranged in such a way that it abstracts away from the details of the underlying servers' filesystems as seen by the client, while at the same time being decoupled from the servers' own organization. The intermediary program can manage the filesystem export space in terms of filesystem paths independent from either clients or servers. The intermediary program thus provides a logically centralized point of control and organization for filesystem resources independent of the particulars of the physical filesystems' organization and distribution.

Figure 18:
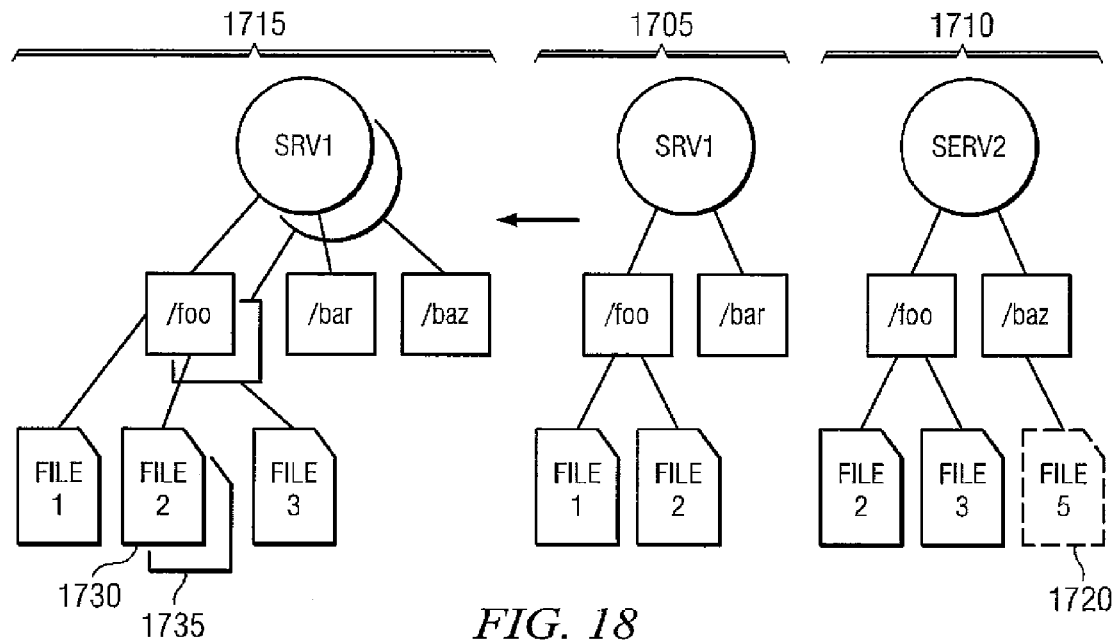
FIG. 18 is a diagrammatic representation of another embodiment of a union filesystem embodied as a stack organization according to the present invention.

FIG. 18 is a diagrammatic representation of another embodiment of a union filesystem embodied as a stack organization according to the present invention. In the example of FIG. 18, an intermediary program can join underlying local or remote filesystems 1705 and 1710 into stack 1715. It can be arbitrarily determined that filesystem 1705 is the top of the stack and filesystem 1710 is the bottom of the stack. To illustrate the behavior of one embodiment of a union filesystem based on stack 1715, filesystems 1705 (srv1) and 1710 (srv2) are stacked such that filesystem 1705 is deemed to be on top of filesystem 1710. Each of these filesystems contains a hierarchically structured "/nested" set of directories and files. srv1 contains directories denoted "/foo" and "/bar", while srv2 contains directories denoted "/baz" and "/foo". The directory called "/foo" in srv1 contains files called 1 and 2, while the directory "/foo" in srv2 contains files called 2 and 3. When these filesystems are "stacked" on each other, to form stack 1715 (i.e., a merged view) that contains directories "/foo", "/bar", and "/baz". In one embodiment of the present invention, a filesystem client will perceive that stack's 1715 "/foo" contains the union of all the files in srv1's "/foo" and srv2's "/foo" directories, thus it sees files named "/foo/1", "/foo/2", and "/foo/3". The ordering of the stack determines precedence when names "collide", i.e. are duplicated in multiple levels of the stack. Since srv1 and srv2 both contain files "/foo/2", the intermediary program can provide a way of determining while of these files is access when the filesystem client refers to stack 1715 "/foo/2." In one embodiment of the present invention, the ordering of the stack makes this unambiguous: in the case of collision of file names, the file that is referenced is the one that is in the highest layer of the stack containing a file with that name. Hence, when referencing a file such as "/foo/2" in a stacked filesystem, the filesystem client will obtain srv1's copy of "/foo/2" rather than srv2's copy.

According to one embodiment of the present invention, an intermediary program can employ a write-through stacking filesystem. One deficiency of previous attempts to stack mount filesystems has been that data could only be written or manipulated in the top stack. For example, if a client application requested to update "foo/3", a new "foo/3" would be created in the top stack and be propagated to "srv1/foo/" rather the to the place the file 3 existed before the operation (i.e., at "srv2/foo/3". Similarly, if an operation is requested to create a file 5 in "/foo/baz" a new "/baz" directory and file 5 (e.g., "/foo/baz/5") will be created in the srv1 volume. One embodiment of the present invention, on the other hand, can write changes through to directories and files on lower levels of the stack. This can be done for example, by maintaining a mapping of export space paths to import space paths and mapping an operation to an export space path to the corresponding import space path that is highest in the stack. Thus, when an operation which creates, deletes, or updates a particular file is received by the intermediary program, the intermediary program can pass the operation along to the underlying topmost filesystem in which the file or its innermost directory is found. Using the example of file 3, if an operation is received to modify file 3 (e.g., "/foo/3", the intermediary program can pass the operation to filesystem 1710 because filesystem 1710 is the topmost filesystem in which file 3 is found. Similarly, if an operation is requested to create a file 5 in "/baz/", the operation can be passed to filesystem 1710 because filesystem 1710 is the topmost directory that contains the "/baz" directory. The ability to write operations through to various layers of the filesystem stack can be referred to as "write-through semantics." This is represented in FIG. 18 by file 1720. It should be noted that while operations are written through to the topmost applicable layer in the previous layer, in other embodiments of the present invention, the operations can be written through to any arbitrary layer in the stack.

As would be understood by one of ordinary skill in the art, when an operation to delete a file is passed to the topmost layer of the stack containing that file, identically named files in the lower layers may become visible. For example, if an operation is requested to delete file 1730, file 1735 may become visible. This is contrary to the expected semantics of filesystems; when a file is deleted, a new version of the file with the same name, and possibly different metadata and data, is not typically expected to become visible. This can be especially problematic if file 1735 is an older version of file 1730. One embodiment of the present invention can eliminate, or at least reduce, this problem by the use of white-out flags.

Figure 19:
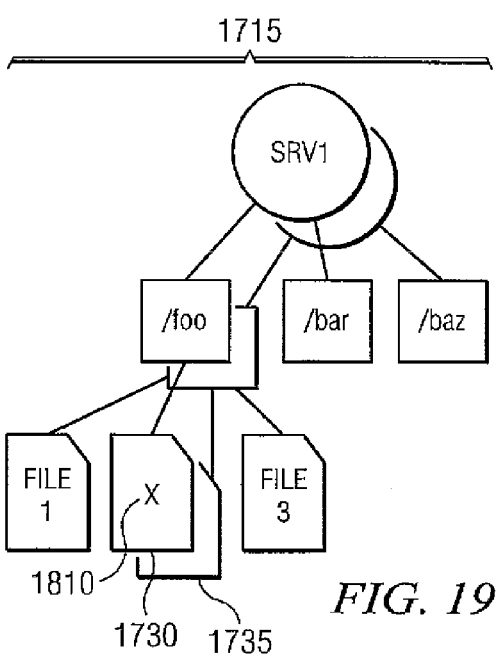
FIG. 19 is a diagrammatic representation of preventing lower layer files from becoming visible when higher layer files with the same name in the same stack are deleted according to one embodiment of the present invention.

FIG. 19 is a diagrammatic representation of preventing lower layer files from becoming visible when higher layer files with the same name in the same stack are deleted. In the example of FIG. 19, stack 1750 of FIG. 18 is used and it is assumed that an operation is requested to delete file 1730. When a request to delete a file is made, an entry can be made in the filesystem (represented by 1810), which prevents file 1735 from becoming visible. The present invention can combine the write-through semantics discussed in conjunction with FIG. 18 and the white-out flags to determine if an operation should be performed. For example, if an operation is requested by a client to delete "/foo/2", the intermediary program can pass this operation to srv1 because srv1 is the filesystem highest in the stack that contains the file "/foo/2". The intermediary program can also note that "/foo/2" has been deleted. Although "/foo/2" exists in lower layers, the intermediary program, in one embodiment of the present invention, will no longer show "/foo/2" to clients because of the whiteout flag. The manner of employing whiteout flags can occur according to a variety of algorithms, as would be understood by one of ordinary skill in the art. In one embodiment of the present invention, the whiteout flags can be essentially invisible objects that note which files have been deleted and highlight similarly named files.

In general, write through semantics with white outs can be implemented in a variety of manners. FIG. 19 illustrates example pseudocode for one embodiment for implementing whiteouts with write-through semantics. FIG. 20 illustrates example pseudocode for operation with write-through semantics and whiteouts in which the file upon which an operation is to occur must exist. FIG. 21 illustrates example pseudocode for operation with write-through semantics and whiteouts in which the file upon which an operation is does not exist. FIG. 22 illustrates example pseudocode for performing an operation that can act on an existing file or create a file if the file does not exist. FIG. 23 illustrates example pseudocode for operations for which a file exits, in which the operation removes the file. As can be understood from the examples of FIGS. 20-23, an operation will be passed to the topmost layer that includes a file or innermost directory. However, if a whiteout exists at a layer of a stack, operations will not be passed through to lower layers. Instead, the operations will either fail or occur at the layer containing the whiteout.

One skilled in the art will appreciate that the pseudocode above represents without loss of generality a specific but nonexclusive embodiment of the present invention in terms of the specific semantics of UNIX filesystems. Alternative implementations of the same semantics both on UNIX filesystems and elsewhere are possible.

FIG. 24 illustrates another embodiment of an intermediary device 2400. For the purposes of example, intermediary device 2400 comprises a main bus 2402, a main processor 2404, a primary storage medium 2406, a secondary storage controller 2408, a storage media 2410, and optionally a network controller 2412, a network interface 2416. Other devices which may be connected to or part of such a computer such as display, mouse, keyboard, and so forth. The main processor 2404 communicates with the other components by way of the main bus 2402. This main processor 2404 can be a general purpose processor, a limited processor such as an ASIC or microcontroller, or any other instruction execution machine. The primary storage 2406 provides transient memory or storage space for use by programs executing on the main processor 2404. The main processor 2404 communicates with the primary storage in any of the conventional ways.

The secondary storage controller 2408 connects some storage media 2410 such as a hard drive, CD-ROM, floppy, tape drive, optical storage medium, memory or other storage device to the main processor 2404 by way of the main bus 2402. The main processor 2404 communicates with the secondary storage controller 2408 by way of the main bus 2402, and the secondary storage controller 2408 is used to read and/or write the storage media 2410 on behalf of the main processor 2404.

Intermediary device 2400 may communicate with other computers by way of a network. This is accomplished by attaching a network interface 2416 to the network and attaching the network interface 2416 to a network controller 2412, and connecting the network controller 2412 to the main bus 2402. Software running on the main processor may then access other computers across the network in any of the conventional ways, e.g. by executing "protocols" which affect the transmission and reception of protocol data units, packets, etc. over the data transmission network. Although shown as a standalone device in FIG. 24, the intermediary device may be integrated with and share components with other devices such as routers, servers, hubs or other network devices known in the art.

Although the present invention has been described in detail, it should be understood that various changes, substitutions and alterations can be made hereto without departing from the scope of the invention as described by the appended claims.

What is claimed is:

1. An apparatus comprising a set of computer instructions stored on a non-transitory computer readable medium and executable by a computer processor to:
   store, in a rulesbase on a server associated with a filesystem on a network, a set of programmable rules associated with a filesystem, wherein the programmable rules comprise administrative policies, access control or security;
   receive, from a client of a plurality of clients operating on a network, a filesystem request indicating a requested filesystem operation for an associated storage media device, wherein the request is communicated according to a network filesystem protocol;
   determine from the filesystem request a filesystem object on which the requested operation is to be performed;
   obtain metadata associated with the filesystem object;
   compare the filesystem request to the one or more rules saved in the programmable rulesbase to determine whether the filesystem request matches a pattern of a rule utilizing at least a portion of the metadata associated with the filesystem object, wherein the pattern specifies and expression for evaluation using the metadata associated with the filesystem object; and
   if the filesystem request matches the pattern, execute an action associated with the pattern.

2. The apparatus of claim 1, wherein the set of computer instructions are further executable to:
   perform the requested filesystem operation; and
   execute the action out-of-band with the requested filesystem operation.

3. The apparatus of claim 1, wherein the set of computer instructions are further executable to:
   execute the action in-band;
   determine whether to proceed with the requested filesystem operation; and
   perform the requested filesystem operation if it is determined that the requested operation should proceed.

4. The apparatus of claim 3, wherein the determination of whether to perform the requested filesystem operation is based on a result of the action.

5. The apparatus of claim 3, wherein a result of the performance of the requested filesystem operation is affected by the result of the action.

6. The apparatus of claim 1, wherein the computer readable instructions are further executable to compare a set of data affected by the requested file system operation to the pattern to determine if the filesystem request matches the pattern.

7. An apparatus comprising a set of computer executable instructions stored on a non-transitory computer readable medium, the set of computer instructions comprising:
   a filesystem manager operable to:
      maintain a filesystem for an underlying storage medium;
      receive a filesystem request from a filesystem client that includes a requested filesystem operation;
      determine from the filesystem request a filesystem object on which the requested operation is to be performed;
      obtain metadata associated with the filesystem object;
      pass the filesystem request to a rules engine; and
      determine whether to proceed with the requested filesystem operation;

a programmable rules base comprising a set of rules, wherein the programmable rules comprise administrative policies, access control or security, wherein each rule further comprises a pattern and an associated action; and a rules engine operable to:
receive the filesystem request;
compare the filesystem request to the one more rules in the programmable rules base to determine if the filesystem request matches one or more rules from the set of rules based on the pattern for each rule utilizing at least a portion of the metadata associated with the filesystem object, wherein the pattern specifies and expression for evaluation using the metadata associated with the filesystem object;
if there are one or more matching patterns, execute the action associated with each matching pattern; and
return a rules engine response to the filesystem manager.

8. The apparatus of claim 7, wherein the filesystem manager determines to perform the requested operation based on the rules engine response.

9. The apparatus of claim 7, wherein the rules engine executes at least one action associated with the one or more matching patterns in-band.

10. The apparatus of claim 9, wherein the rules engine executes at least one action associated with the one or more matching patterns out-of-band.

11. A method for applying rules to filesystem operations comprising:
store, in a rulesbase on a server associated with a filesystem on a network, a set of programmable rules associated with a filesystem, wherein the programmable rules comprise administrative policies, access control or security;
receive at a filesystem server computer a filesystem request from a filesystem client computer indicating a requested filesystem operation;
determine from the filesystem request a filesystem object on which the requested operation is to be performed;
obtain metadata associated with the filesystem object;
compare the filesystem request to the one or more rules saved in the programmable rulesbase to determine whether the filesystem request matches a pattern of a rule utilizing at least a portion of the metadata associated with the filesystem object, wherein the pattern specifies and expression for evaluation using the metadata associated with the filesystem object; and
if the filesystem request matches the pattern, execute an action associated with the pattern.

12. The method of claim 11, further comprising:
performing the requested filesystem operation; and
execute the action out-of-band with the requested filesystem operation.

13. The method of claim 11, further comprising:
executing the action in-band;
determining whether to proceed with the requested filesystem operation; and
performing the requested filesystem operation if it determined that the requested operation should proceed.

14. The method of claim 13, wherein the determination of whether to perform the requested filesystem operation is based on a result of the action.

15. The method of claim 13, wherein a result of the performance of the requested filesystem operation is affected by the result of the action.

16. The method of claim 11, further comprising comparing a set of data affected by the requested file system operation to the pattern to determine if the filesystem request matches the pattern.

17. A method for applying rules to filesystem operations, comprising:
storing, in a rulesbase on a server associated with a filesystem on a network, a set of programmable rules associated with a filesystem, wherein the programmable rules comprise administrative policies, access control or security;
receiving at a filesystem server computer a filesystem request from a filesystem client that includes a requested filesystem operation;
determining from the filesystem request a filesystem object on which the requested operation is to be performed;
obtaining metadata associated with the filesystem object;
determining whether to proceed with the requested filesystem operation;
comparing the filesystem request to one more rules saved in the programmable rulesbase to determine if the filesystem request matches one or more rules from the set of rules based on a pattern for each rule utilizing at least a portion of the metadata associated with the filesystem object, wherein the pattern specifies and expression for evaluation using the metadata associated with the filesystem object;
if there are one or more matching patterns in the programmable rulesbase, executing an action associated with each matching pattern; and
returning a rules engine response.

18. The method of claim 17, wherein determining whether to proceed with the requested operation is based on the rules engine response.

19. The method of claim 17, further comprising executing at least one action associated with the one or more matching patterns in-band.

20. The method of claim 19, further comprising executing at least one action associated with the one or more matching patterns out-of-band.

* * * * *